United States Patent [19]
Vassiliadis et al.

[11] Patent Number: 5,414,797
[45] Date of Patent: May 9, 1995

[54] CLUSTERING FUZZY EXPECTED VALUE SYSTEM

[75] Inventors: Stamatis Vassiliadis; George Triantafyllos; Walid Kobrosly, all of Vestal, N.Y.

[73] Assignee: International Business Machines Corp., Armonk, N.Y.

[21] Appl. No.: 920,723

[22] Filed: Jul. 28, 1992

Related U.S. Application Data

[63] Continuation-in-part of Ser. No. 701,558, May 16, 1991, abandoned.

[51] Int. Cl.$^6$ .................. G06F 15/40; G06F 9/44
[52] U.S. Cl. ...................... 395/51; 395/600; 395/900; 395/934
[58] Field of Search .............. 395/600, 934, 900, 51, 395/61

[56] References Cited

U.S. PATENT DOCUMENTS

| | | | |
|---|---|---|---|
| 5,020,019 | 5/1991 | Ogawa | 364/900 |
| 5,140,692 | 8/1992 | Morita | 395/600 |
| 5,168,565 | 12/1992 | Morita | 395/600 |

OTHER PUBLICATIONS

Sachs, W. M., "An Approach to Associative Retrieval through the Theory of Fuzzy Sets," J. American Soc. for Info. Science, 1976, 85–87.

Salton et al., Intro-to Modern Info. Retrieval, McGraw-Hill Book Co., 1983, 59–75, 421–426.

Kamel et al., "Fuzzy Query Processing Using Clustering Techniques," Info. Processing and Management, 1990, 279–293.

Primary Examiner—Robert W. Downs
Attorney, Agent, or Firm—Eugene I. Shkurko; Lynn A. Augspurger

[57] ABSTRACT

A system provides a tool for computing the most typical fuzzy expected value of a membership function in a fuzzy set. The clustering fuzzy expected value system is used in a question answering system. CFEV is computed by the tool is based on grouping of individual responses, that meet certain criteria, to clusters. Each cluster is considered a "super response" and contributes to the result proportionally to its relative size and the difference in opinion from the mean of the entire sample. In so doing, CFEV represents the opinion of the majority of the population, but it also respects the opinion of the minority. A comparison is made with existed tools such as the FEV and the WFEV and the advantages of CFEV are demonstrated by examples for cases where other methods fail to perform.

13 Claims, 11 Drawing Sheets

| COMMENT | MIN OPERATOR | PRODUCT OPERATOR | BOUNDED SUM OPERATOR | AVERAGE | FUZZY EVALUATOR |
|---|---|---|---|---|---|
| <SYNTAX, ERROR> | 0.10 | 0.08 | 0 | 0.45 | 0.27 |
| <COMMENT, SYNTAX> | 0.10 | 0.01 | 0 | 0.10 | 0.03 |
| <UPDATE, COMMENT> | 0.10 | 0.05 | 0 | 0.30 | 0.14 |
| <FIX, UPDATE> | 0.50 | 0.40 | 0.30 | 0.65 | 0.78 |
| <FIX, BUG> | 0.80 | 0.72 | 0.70 | 0.85 | 0.97 |

FIG.7

| X VALUES | CONFIDENCE CLOSER TO THE Y VALUES |
|---|---|
| 0.1 | NEVER |
| 0.2 | NEVER |
| 0.3 | IF Y > 0.8 |
| 0.4 | IF Y > 0.6 |

FIG.9

| X\Y | 0.0 | 0.1 | 0.2 | 0.3 | 0.4 | 0.5 | 0.6 | 0.7 | 0.8 | 0.9 | 1.0 |
|---|---|---|---|---|---|---|---|---|---|---|---|
| 0.0 | 0.000 | 0.000 | 0.000 | 0.000 | 0.000 | 0.000 | 0.000 | 0.000 | 0.000 | 0.000 | 1.000 |
| 0.1 | 0.000 | 0.080 | 0.123 | 0.167 | 0.213 | 0.260 | 0.308 | 0.358 | 0.408 | 0.460 | 1.000 |
| 0.2 | 0.000 | 0.123 | 0.169 | 0.216 | 0.266 | 0.317 | 0.369 | 0.423 | 0.478 | 0.533 | 1.000 |
| 0.3 | 0.000 | 0.167 | 0.216 | 0.268 | 0.321 | 0.376 | 0.433 | 0.490 | 0.548 | 0.605 | 1.000 |
| 0.4 | 0.000 | 0.213 | 0.266 | 0.321 | 0.379 | 0.438 | 0.498 | 0.557 | 0.617 | 0.675 | 1.000 |
| 0.5 | 0.000 | 0.260 | 0.317 | 0.376 | 0.438 | 0.500 | 0.562 | 0.624 | 0.683 | 0.740 | 1.000 |
| 0.6 | 0.000 | 0.308 | 0.369 | 0.433 | 0.498 | 0.562 | 0.626 | 0.688 | 0.746 | 0.800 | 1.000 |
| 0.7 | 0.000 | 0.358 | 0.423 | 0.490 | 0.557 | 0.624 | 0.688 | 0.748 | 0.804 | 0.854 | 1.000 |
| 0.8 | 0.000 | 0.408 | 0.478 | 0.548 | 0.617 | 0.683 | 0.746 | 0.804 | 0.855 | 0.901 | 1.000 |
| 0.9 | 0.000 | 0.460 | 0.533 | 0.605 | 0.675 | 0.740 | 0.800 | 0.854 | 0.901 | 0.940 | 1.000 |
| 1.0 | 1.000 | 1.000 | 1.000 | 1.000 | 1.000 | 1.000 | 1.000 | 1.000 | 1.000 | 1.000 | 1.000 |

FIG.10

| X\Y | 0.0 | 0.1 | 0.2 | 0.3 | 0.4 | 0.5 | 0.6 | 0.7 | 0.8 | 0.9 | 1.0 |
|---|---|---|---|---|---|---|---|---|---|---|---|
| 0.0 | 0.000 | 0.000 | 0.000 | 0.000 | 0.000 | 0.000 | 0.000 | 0.000 | 0.000 | 0.000 | 1.000 |
| 0.1 | 0.000 | 0.036 | 0.059 | 0.085 | 0.115 | 0.148 | 0.186 | 0.229 | 0.276 | 0.327 | 1.000 |
| 0.2 | 0.000 | 0.059 | 0.089 | 0.124 | 0.166 | 0.215 | 0.271 | 0.333 | 0.400 | 0.471 | 1.000 |
| 0.3 | 0.000 | 0.085 | 0.124 | 0.173 | 0.231 | 0.298 | 0.374 | 0.455 | 0.539 | 0.621 | 1.000 |
| 0.4 | 0.000 | 0.115 | 0.166 | 0.231 | 0.308 | 0.395 | 0.489 | 0.583 | 0.673 | 0.753 | 1.000 |
| 0.5 | 0.000 | 0.148 | 0.215 | 0.298 | 0.395 | 0.500 | 0.605 | 0.702 | 0.785 | 0.852 | 1.000 |
| 0.6 | 0.000 | 0.186 | 0.271 | 0.374 | 0.489 | 0.605 | 0.711 | 0.800 | 0.868 | 0.917 | 1.000 |
| 0.7 | 0.000 | 0.229 | 0.333 | 0.455 | 0.583 | 0.702 | 0.800 | 0.873 | 0.924 | 0.957 | 1.000 |
| 0.8 | 0.000 | 0.276 | 0.400 | 0.539 | 0.673 | 0.785 | 0.868 | 0.924 | 0.959 | 0.979 | 1.000 |
| 0.9 | 0.000 | 0.327 | 0.471 | 0.621 | 0.753 | 0.852 | 0.917 | 0.957 | 0.979 | 0.991 | 1.000 |
| 1.0 | 1.000 | 1.000 | 1.000 | 1.000 | 1.000 | 1.000 | 1.000 | 1.000 | 1.000 | 1.000 | 1.000 |

FIG. 11

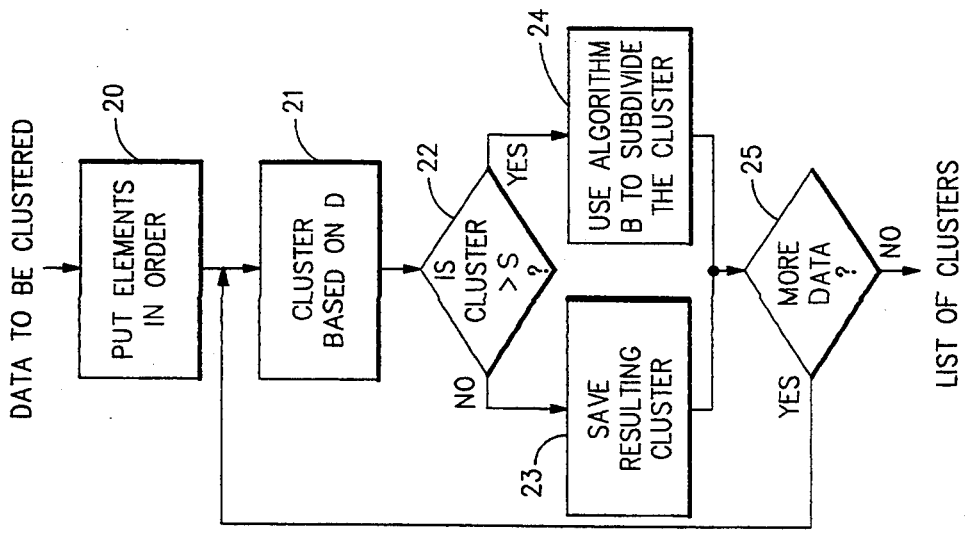
FIG.13
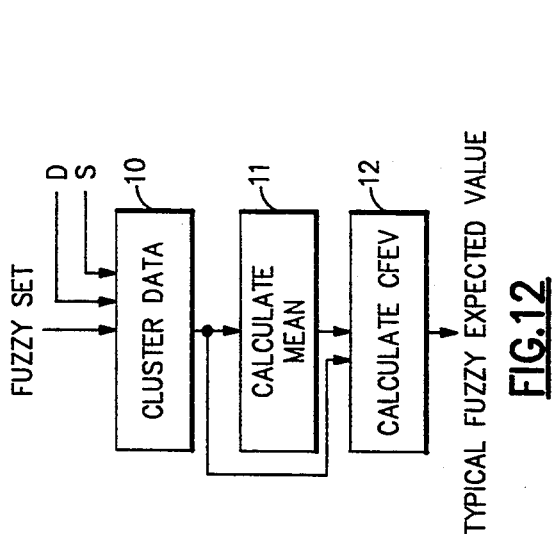
FIG.12
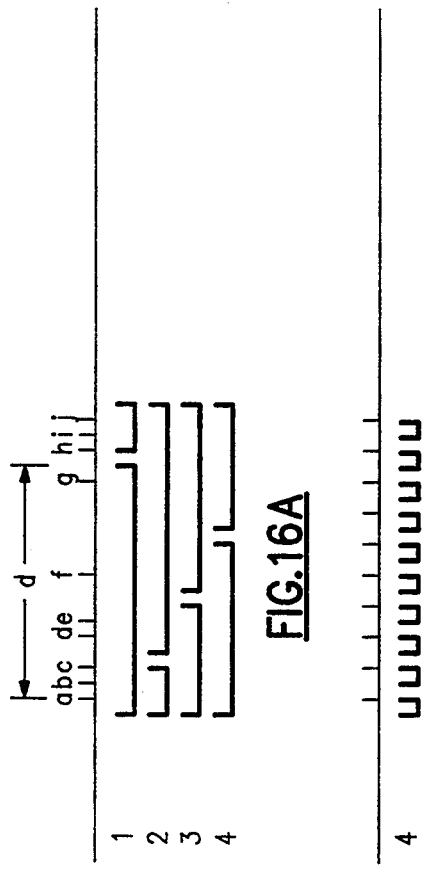
FIG.16A
FIG.16B

CLUSTERING FUZZY EXPECTED VALUE SYSTEM

RELATED APPLICATION

This application claims the priority of and is a continuation in part of the following application:

U.S. patent application Ser. No. 07/701,558, filed May 16, 1991, entitled "A FUZZY REASONING DATA BASE QUESTION ANSWERING SYSTEM", of S. Vassiliadis et al., now abandoned.

The related application and this application are assigned to International Business Machines Corporation of Armonk, New York. The related application is incorporated by reference.

FIELD OF THE INVENTION

The present invention relates to a tool for computing the most typical fuzzy expected value of a membership function in a fuzzy set.

Clustering Fuzzy Expected Value System is a system that deals with the most typical value of a set of numbers, called membership values, which represent the membership of an element in a fuzzy set. Given a set of membership values the CFEV system will produce a single membership value that is most typical in the set, in the sense that it represent the majority of the membership. values but it also considers the minority of the membership values in the set. In making available this tool we include for the purpose of background discussion the following publications that relate to similar tools such as the Fuzzy Expected Value (FEV) and the Weighted Fuzzy Expected Vauel (WFEV).

1. A. Kandel, "Fuzzy Mathematical Techniques with Applications," (book) Addison-Wesley, Massachusetts, 1986.
2. M. Friedman, M. Schneider and A. Kandel, "The Use of the Weighted Fuzzy Expected Value (WFEV) in Fuzzy Expert Systems," Fuzzy Sets and Systems Vol. 31, pp. 37-45, May 1989.

A. Kandel introduced a new method of computing the most representative value of a fuzzy set, called the Fuzzy Expected Value (FEV). The FEV is described as "a new quantity that more than the mean value or the median, would indicate the most typical grade of membership of a given fuzzy set". Consider a fuzzy relation defined over the universe X which yields a fuzzy set A with a membership function $X_A$ that satisfies $$0 \leq X_A(x) \leq 1, x \in X$$

Let $\mu$ be a fuzzy measure defined over the subsets of X and let $$\xi_T = \{x | \chi_A(x) \geq T\}, 0 \leq T \leq 1,$$

Then, the fuzzy expected value, FEV, of $X_A$ over A, is define by $$FEV = \sup_{T \in [0,1]} \{\min[T, \mu(\xi_T)]\}$$

where, $\mu\{x|\chi_A(x) \leq T\} = f_A(T)$ is a function of the threshold T. The values $\mu(\xi_r)$ are computed by the following formula:

$$\mu_i = \mu(\xi_{x_{j+1}}) = \frac{1}{N} \sum_{j=i+1}^{m} n_j, 1 \leq i \leq m - 1$$

The FEV is illustrated by the following example:

EXAMPLE 1

Consider a fuzzy set which consists of four observations as summarized in the following table:

| i | $\mu(X_A)$ | $n_i$ | $p(x)$ |
|---|---|---|---|
| 1 | 0.10 | 10 | 0.1 |
| 2 | 0.15 | 25 | 0.25 |
| 3 | 0.20 | 15 | 0.15 |
| 4 | 0.55 | 55 | 0.55 |

Let $\mu(x_A) = \{\mu_1, \mu_2, \ldots, \mu_n\}$(a) be a set of n membership grades sorted in ascending order with $\mu_1 < \mu_2 < \ldots < \mu_n$. Let $p(x) = \{p_1, p_2, \ldots, P_n\}$(b), with $p_1 + p_2 + \ldots + p_n = 1$, be the corresponding fraction of the observations for each element of the set x. Finally, let the set C be $c = \{p_n, p_{n-1} + p_n, \ldots, p_2 + p_3 + \ldots + p_n\}$. The FEV is defined as the median of the set $\delta$ produced by the union of the sets $\mu(x_A)$ and c, sorted in ascending order.

For the example above, $\delta$ becomes:

$$\delta = \{0.1, 0.15, 0.2, 0.5, 0.55, 0.15+0.55, 0.25+0.15+0.55\}$$

Thus, FEV=0.55. M. Friedman, M. Schneider and A. Kandel suggest that the FEB "may occasionally generate improper results" and-attributed such a failure to "its insensitivity to population's density". We agree with Friedman, et. al. and additionally suggest the following: FEV involves the opinions of the observers with the number of observations. While there may be some correlation between opinions and observers having those opinions, it is not clear what this correlation is. Given that population has been included in the opinion, it can be concluded that the failure is not casual as indicated by Friedman, et. al. Indeed, as shown by the two properties reported in Appendix A, FEV will always fail when the percentage, $p_x$ of the group with the biggest membership grade $\mu_x$ is $p_x > \mu_x$ or when the percentage of the group with the smallest membership grade is $p_x > \mu_x$.

Given that M. Friedman, M. Schneider and A. Kandel, observed that the FEV "may occasionally generate improper results", he introduced the Weighed Fuzzy Expected Value (WFEV), defined as follows: Let $\omega(x)$ be a non-negative monotonically decreasing function defined over the interval [0,1] and $\lambda$ a real number greater than 1. The solution s of $$s = \frac{\chi_1 \omega(|\chi_1 - s|) n_1^\lambda + \ldots + \chi_m \omega(|\chi_m - s|) n_m^\lambda}{\omega(|\chi_1 - s|) n_1^\lambda + \ldots + \omega(|\chi_m - s|) n_m^\lambda} \quad (2)$$

is the WFEV and is denoted WFEV($\omega,\lambda$). Where, $\omega(x) = e^{-\beta x}$, $\beta > 0$, $\lambda$ is a real number $> 1$, n is the number of values in a set, and s is the weighted fuzzy expected value of order $\lambda$.

The following example illustrates the use of WFEV which we have invented.

EXAMPLE 2

Consider the following example, taken from Friendman's description:

| i | $\mu_i$ | $n_i$ | $p_i$ |
| --- | --- | --- | --- |
| 1 | 0.125 | 7 | 0.07 |
| 2 | 0.375 | 19 | 0.19 |
| 3 | 0.625 | 31 | 0.31 |
| 4 | 0.875 | 43 | 0.43 |

For this example, $\mu(x)=\{, 0.125, 0.375, 0.625, 0.875\}$ and $p(x)=\{0.07, 0.19, 0.31, 0.43\}$. To compute the WFEV values for the parameters $\lambda,\beta$ must be chosen. Choosing $\lambda=1$, $\beta=2$ as suggested by Friedman, Equation (2) converges after 4-5 iterations to s=0.745. Since 74% of the population answered either 0.625 or 0.875, the most typical value is expected to fall somewhere between 0.625 and 0.875. Indeed, all methods give an answer in this interval: (FEV=0.625, mean=0.65, median=0.625, WFEV=0.745. What is, however, the best value? M. Friedman, M. Schneider and A. Kandel argue that "WFEV is clearly the best choice" because it falls in the interval (0.625, 0.875) and considers the 'few' elements that fall outside that interval. But the 'few' elements outside the (0.625, 0.875), interval are 26% of all observations. Since 26% of the population is outside the interval (0.625, 0.875) the answer should be between the mean of (0.625, 0.875) and 0.625 to reflect the fact that 26% of the data disagree with the biggest groups. The mean respects this observation and by no means can it be discarded as non-typical.

However, while we have invented the above, there are situations which the prior development fails to produce a completely satisfactor answer. The following example illustrates a case where WFEV clearly fails to produce a satisfactory answer.

EXAMPLE 3

WFEV is insensitive to big changes to small groups

| i | $\mu_i$ | $n_i$ | $p_i$ |
| --- | --- | --- | --- |
| 1 | 0.60 | 10 | 0.20 |
| 2 | 0.95 | 40 | 0.80 |

So far, the WFEV was considered using the same parameters, $\lambda=2$ and $\beta=1$ given in in Friedman's description. However, as M. Friedman, M. Schneider and A. Kandel point out, the choice of the best $\lambda$, $\beta$ may require experimentation, or even the development of an exped: system that will chose the best $\lambda$, $\beta$ for a particular application based on a user's supplied knowledge base. Since the behavior of WFEV depends on good values $\lambda$, $\beta$ the problem becomes how to chose those values. Consider for example the following case:

If we assume that example #2 is our knowledge base and that WFEV=0.745 is a good answer then we need to choose $\lambda$, $\beta$ such that the desired result for example 1 is obtained. If the WFEV algorithm is applied to example 1, the following is obtained:

WFEV(2,1)=0.74508
WFEV(1,6)=0.74418

Both sets of values for $\lambda,\beta$ yield almost the same results for the example under considerations, and there may be other sets of values that yield the same answer, as well.

Let us now consider another example, which is shown below, and apply the two sets of values found above to calculate WFEV.

EXAMPLE 4

| i | $\mu_i$ | $n_i$ |
| --- | --- | --- |
| 1 | 0.1 | 5 |
| 2 | 1.0 | 1 |

WFEV(2,1) = 0.11483
WFEV(1,6) = 0.97263

The choice of $\lambda=2$, $\beta=1$ yields WFEV=0.11483 which may be considered as typical fuzzy expected value for the given example. However, the second choice for $\lambda$, $\beta$ yields anything but a typical value. In order for a user, or even an exped system, to pick the best values among a Set would require the application of these values to a number of problems and there is no structured way that may determine parameters that will result in a reliable analysis.

A consequence of the above discussion is that it is of interest to develop a tool that produces a result close to the majority of the data, but also considers the other membership grades of a fuzzy set. The tool should be insensitive to small variations in the data and it should recognize the groups of data that have opinions close to each other that may be represented by one group. In the following sections, we provide a brief description of the Clustering Fuzzy Expected Value (CFEV) algorithm. The clustering methods are then discussed in detail. Following that, the computation of CFEV is presented and its behavior is analyzed. Consequently, the performance of CFEV is compared with other methods such as mean, median, FEV and WFEV, and the superiority of the CFEV is shown by means of examples. CFEV is particularly important since we have found it improves even the performance of our FUZZY REASONING DATABASE QUESTION ANSWERING SYSTEM which was first described in U.S. patent application Ser. No. 07/701,558, filed May 16, 1991, entitled "A FUZZY REASONING DATA BASE QUESTION ANSWERING SYSTEM", of S. Vassiliadis et al. and it may be used in our described system to provide improved results, as we will describe.

Background to Fuzzy Reasoning Data Base Question Answering System

As background for question answering systems, we have explained that a question answering system is a system which deals with natural language statements and/or questions. The question answering system of the present invention uses fuzzy logic concepts. Fuzzy logic is described for example in Michael Smithson's work entitled *Fuzzy Set Analysis for Behavioral and Social Sciences*, published by Springer-Verlag, New York Inc., 1987.

The FUZZY REASONING DATA BASE QUESTION ANSWERING SYSTEM relates in particular to database answering question problems existing during the design of computer systems, and it is in depth described by the following. During the different design, test, and release phases of the development of a computer system, a number of databases, in the form of libraries, are developed and maintained for a variety of purposes such as error tracking and bookkeeping. To understand and improve the development process, previously developed databases may be used at a later date as representatives of the entire, or as representative of part of the process. We have analyzed these with the intent to develop algorithms and tools for future use. If a database has been developed with a particular purpose in mind, then it can be used for future studies in its entirety because the objective of the database was specified a priori. For example, if a library has been developed to report the functional errors discovered during the hardware design of a system, then such a library can be used in its entirety at the end of the development for a study concerning functional errors in hardware design.

However, on a number of occasions, it may be the case that a developed database needs to be used for a different purpose than originally anticipated. Such a necessity may arise for a variety of reasons including unanticipated studies. For example, a library that is created at or with the beginning of the development cycle for bookkeeping purposes contains information regarding the history of the logic design, and possibly it may contain information related to functional testing studies. If it is assumed that the database is accessed for routine bookkeeping functions, then when a functional error is discovered it would be desirable to be able to correct the error. Additionally, assuming its applicability is granted, such a database may be considered as more representative for functional error studies than an error tracking library, if the latter has been developed at the integration phase of the system development.

When a database is suspected of containing pertinent information to a process, it is possible to presume that the entire data base is pertinent to the intended application. An example of this can be found in *An Application of Cyclomatic Complexity Metrics to Microcode* by Timothy McNamara, TR 01.A517, IBM Corporation, Systems Product Division, Endicott, N.Y. However, this presumption may not be a good choice in most circumstances because such a database was not developed to accommodate the application of interest, and it may result in erroneous conclusions regarding the development process. In essence, it is advisable to investigate the suspicion regarding the relevancy of the database to an intended application. In order to assess whether a database contains information pertinent to a subject of interest, it would be desirable to have a tool that provides the capability to assess the validity of the decision, and when it is found that the library is pertinent to the subject of interest, to exclude irrelevant library entries. We know of no tool like the one we developed which provides the appropriate functions.

Since databases which emerge during the development of a computer system generally contain "comments", the previous database issues for such systems can be addressed by the examination of such comments.

A validation methodology could be developed using probability theory; however, this approach may not be the most appropriate. This is because the validation of the database must be carried out from the comments of the database, which are written in a natural language, through the use of some form of common reasoning. A consequence of the previous statements is that a probability approach may not be the most appropriate for this type of applications because, as indicated by G. Klir in his paper "Is There More to Uncertainty than some probability Theorists might have us Believe?", published in the *International Journal of General Systems*, Vol. 15, No. 4, April 1989:

An attempt to reduce the non-specificity or fuzziness inherent to the natural language descriptions may be unwarranted, and "It is not clear to me how probability theory could effectively describe and manipulate the great variety of descriptions or rules that are possible in natural language."

A different approach to the validation of a commented database might be to develop a natural language question answering system. While it may be entirely possible to develop such a system, possibly with use of fuzzy relations, such a solution may not be the most advantageous for a number of reasons, including the following:

A computer system may be developed in more than one country and consequently the comments of the databases may be written in more than one natural language, implying that more than one system needs to be developed. An example of this is the IBM 9370 computer systems which were developed in a number of countries having different natural languages including the United States and West Germany.

Verifying the validity of a Clarabase is not the final purpose of the study. The development of natural language question answering systems may require a substantial effort and possibly, if the database is not appropriate to the application, it may need to be discarded. The concern here is not so much with the possible solution to the problem but rather with the implementation and development efforts, especially when it may be determined at a later phase of the project that the database does not pertain to the intended purpose of an application.

A natural language question answering system may not be applicable to different databases and/or different types of investigations in its entirety. Consequently, at least a portion of the question answering system needs to be modified and/or expanded to reflect the desired application.

As a consequence of the examination we made of possibilities as just outlined, we believe there is an apparent unfulfilled need for a new tool that will expedite and facilitate the evaluation of a commented database with minimal effort. Such a tool should be able to be applied in a variety of circumstances with minimum additional development effort in its use. Such a tool will most certainly allow for more time to be exerted on the analysis of the database rather than the assessment of its applicability. Moreover, as we conceive of it, if it is assessed that the system is not accurate enough to guarantee a reasonable exclusion of comments, the system could then be used as an indicator of compliance of a database to a pre-specified application, and its capabilities may be extended with the utilization of a natural language question answering system to further investigate the relevancy of the database.

If such a tool had existed, one having the capabilities of the tool we have created, then a natural language question answering system need be implemented only in the case when a more accurate analysis is required. Consequently, the development of such a natural language question answering system will take place only when it is needed rather than a priori, as it would be without our tool.

The solution which we provide is a question answering system based on fuzzy logic. The tool provides a quick assessment of the applicability of a database to a specified universe of discussion and the exclusion of the irrelevant comments of the database. In making available this new tool, we have employed for the purpose of background discussion in our detailed description which follows a few publications, including those mentioned at the beginning of this application and the following:

1. "Fuzzy Techniques in Pattern Recognition," (book) by A. Kandel, published by John Wiley and Sons, in New York, 1982;
2. "Fuzzy Set Analysis for Behavioral and Social Sciences", (book) by Michael Smithson, published by Springer-Verlag Inc, in New York, 1986;
3. "On the Precision of Adjectives which Denote Fuzzy Sets" by M. Kochen and A. Badre published in the Journal of Cybernetics, Vol. 4, No. 1, January 1974.
4. "Modelling Membership Functions" by P. Zysno published in Empirical Semantics, Vol. 1, in January 1981.

In the following sections, we provide a brief description and an intuitive justification and reasoning for the development of the fuzzy question answering system. The concept of degree of confidence, as it relates to words and comments within a database, is then formally defined and formulated. In the subsequent discussion, the fuzzy evaluator algorithm is described, and its capabilities are discussed.

SUMMARY OF THE INVENTION

A tool for computing a Clustering Fuzzy Expected Value (CFEV) is provided for generating a fuzzy expected value which is close to the majority of the data examined in a set of data, but also considers the membership grades of the small populations in a fuzzy set. The new tool may be used to substitute the FEV or WFEV when a more representative result is required, or in cases where the first two fail to produce a typical result, as discussed in the previous section of this invention.

In brief, the system can be described as a three-phase process: First, the elements of a fuzzy set are clustered into separate groups, such that the membership grades in the same cluster are closely associated. The desired degree of association is given by the user in two parameters, d, s. Then the system computes the mean of the entire set and the mean of each cluster. In the third phase the system computes the CFEV value of the set.

Summary of the Fuzzy Reasoning Data Base Question Answering System

We have provided a new tool for answering questions dealing with databases written in a spoken language which can use the CFEV. We call the tool a Fuzzy Reasoning Database Question Answering System based upon fuzzy logic. The new tool may be used as a substitute for a natural language question answering system for the evaluation of the relevancy of a database with respect to some subject of interest. The proposed system provides the capability to assess whether a database contains information pertinent to a subject of interest, by evaluating each comment in the database via a fuzzy evaluator which attributes a fuzzy membership value indicating its relationship to a particular subject. An assessment is provided for the database as a whole regarding its pertinence to the subject of interest, and consequently comments that are considered as irrelevant to the subject may be discarded.

In brief, the tool may be described as a three-phase process. In the first phase, the database preprocess, the comment fields of the database are examined to find the words that may, in general, be used to describe a particular subject in either an affirmative or a negative way. These words are then, in the second phase, assigned a confidence value reflecting how they are most likely used in the database by personnel participating in the creation of the database or persons familiar with the subject. In the third phase, each comment of the database is evaluated using the words from phase one and their corresponding confidence values from phase two. The result of this process is a vector of numbers, one for each record, indicating the membership grade of the records to a particular set, the subject of interest. Based on this confidence vector, a decision may be made as to the pertinence of the database to a subject of interest. If the confidence vector indicates that a sufficient percentage of the records possess a strong association with the subject of interest, then the tool may extract these records for further use in the study of a particular subject.

Our new system is described in the following detailed description and specifically with reference to the appended drawings which are described below.

BRIEF DESCRIPTION OF THE DRAWINGS OF THE FUZZY REASONING DATA BASE QUESTION ANSWERING SYSTEM

FIG. 7 illustrates Pair Confidence Values for the AND Operators, the Average and the Fuzzy Evaluator; FIG. 9 illustrates Properties 5 and 6, Pair Confidence Values; and FIG. 10 illustrates the Membership Grade Values for $k=1$ and $l=0.5$; while FIG. 11 illustrates the Membership Grade Values far $k=4.5$ and $l=0.5$.

FIG. 12 shows the Clustering Fuzzy Expected Value (CFEV) System in accordance with our preferred embodiment; and FIG. 13 shows the Cluster Generator we employ; FIG. 16 shows a clustering example.

DETAILED DESCRIPTION OF THE FUZZY REASONING DATA BASE QUESTION ANSWERING SYSTEM

Figure 1:
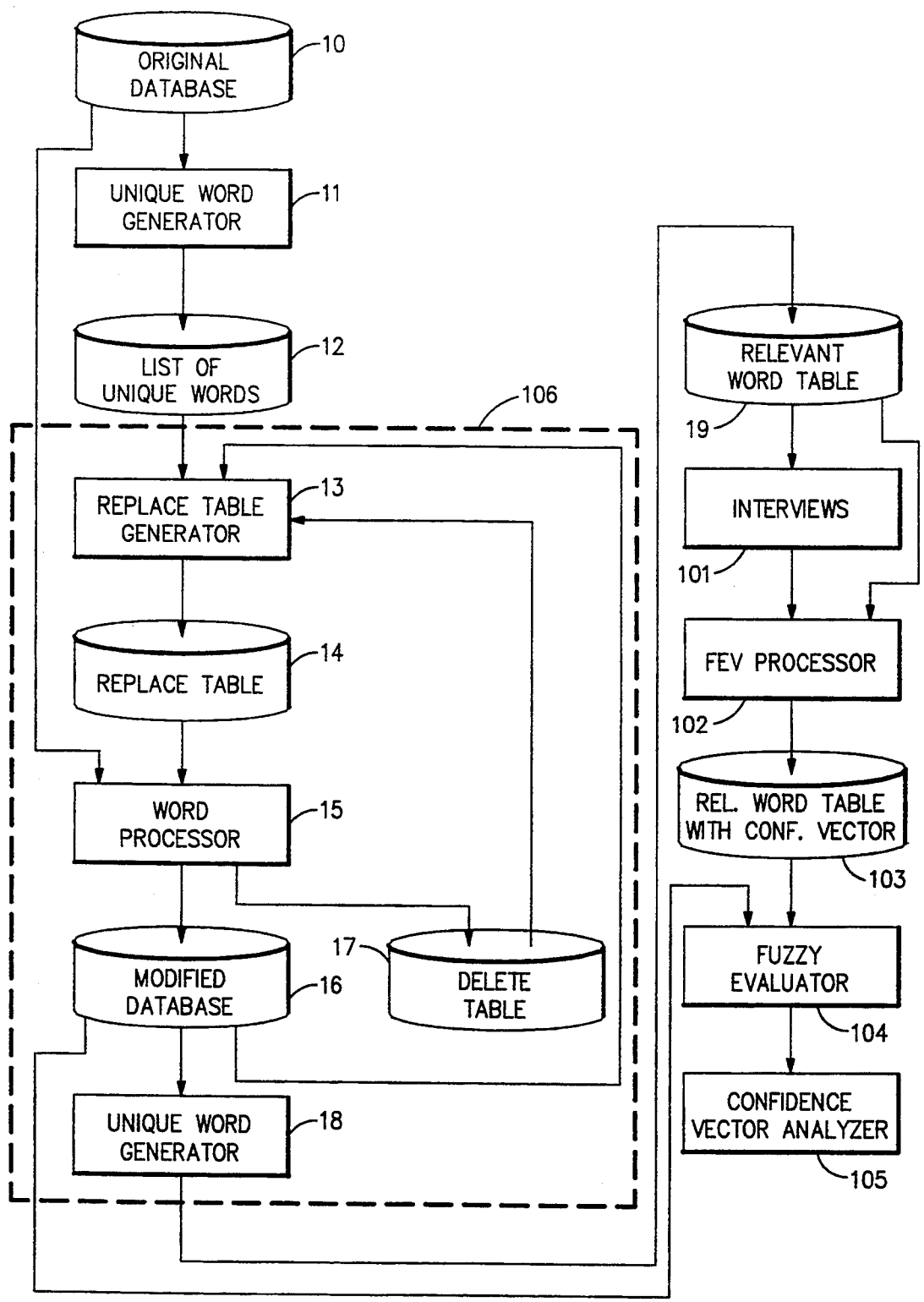
FIG. 1 shows the Fuzzy Reasoning Database Question Answering System in accordance with our preferred embodiment.
Figure 2:
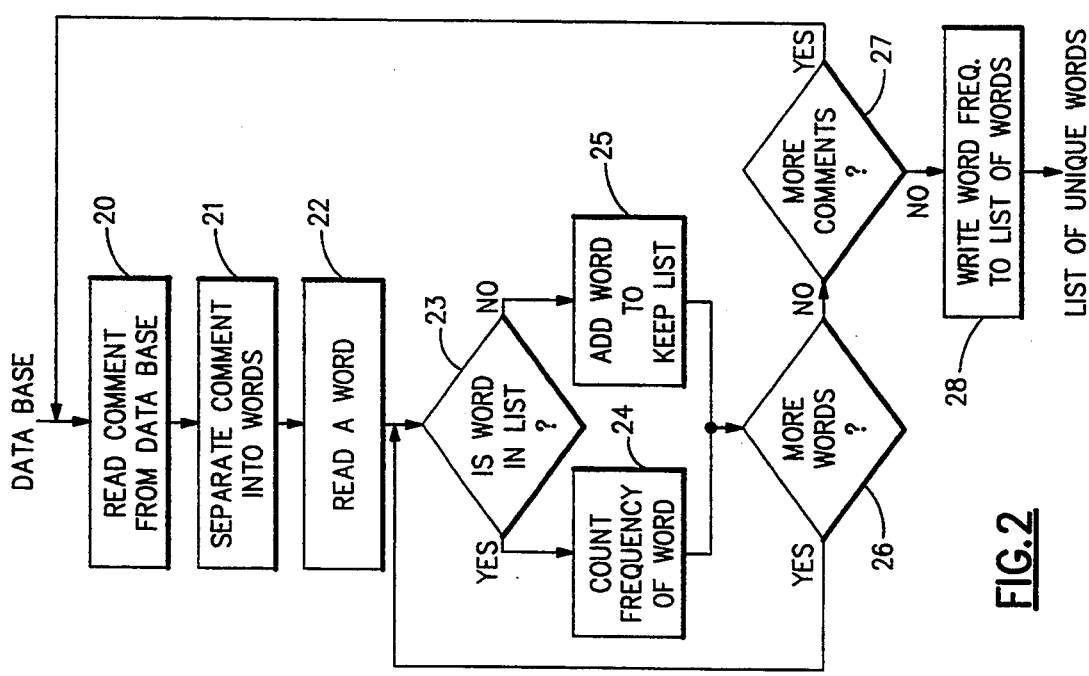
FIG. 2 illustrates the Unique Word Generator we employ.

The overall design of the proposed system is shown in its preferred embodiment in the drawings for the fuzzy reasoning database question answering system illustrated by FIG. 1. In our preferred embodiment now the FEV Processor of FIG. 1 may be modified to result in the Clustering Fuzzy Expected Value Processor illustrated by FIGS. 12–18. However, the base question answering system remains as described with respect to FIG. 1. That system comprises:

The Unique Word Generator, 11, further illustrated by FIG. 2;
The Relevant Word Table Generator, 106;
Interviews, 101;
The FEV Processor, 102;
The Fuzzy Evaluator, 104, illustrated in detail in FIG. 5 and
The Result Analyzer, 105.

Details of the preferred embodiment follow.

The Unique Word Generator, 11

The unique word generator 11, which is described in more detail in FIG. 2 blocks 20 through 28 of FIG. 2, analyzes the comments in a database and generates an alphabetically sorted list of all unique words 12 contained in the comments of the database. The comments of the database are presented to the unique word generator in an ASCII file, one comment per line. Block 20 of FIG. 2 reads a line from the file and sends it to block 21 which separates the line into words and saves the number of words found in the comment for later use. These words are kept in a temporary list in the main memory of the computer. Block 22 of FIG. 2 reads a word from the temporary list and checks to see if the word is in the list of words maintained by the unique word generator. This list, which is called the "Keep List", is stored in an ASCII file, one word per line. If the word being examined is already in the "Keep List", decision block 23, then a counter is incremented for that word by means of block 24. This counter provides information about the frequency with which the word is used in the database. If the word is not in the list, then the decision block 23 transfers control to block 25 which adds the word to the "keep list" in alphabetical order. Block 26 of FIG. 2 checks for more words in the current comment and transfers control to block 22 if there are more words to be processed; but otherwise it transfers control to block 27 which checks for more comments to be read from the input file. When all comments of the database have been processed, decision block 27 transfers control to block 28 which writes the frequency of each word next to each word in the "Keep List". Block 28 uses the number of words found for each comment in block 21 to calculate the following statistics:

1. total number of words in the database
2. number of unique words
3. number of records containing zero, one, two, etc words.

The above statistics are stored in an ASCII file for later use. In addition to legitimate words, the list of unique words may include misspelled words, abbreviations, acronyms, abbreviations, etc. The frequency of each word, as computed by this process, is used in subsequent processes to identify the words that are used most in the database. In addition to the list of unique words, this process also computes the percentage of records that contain zero, one, two, etc. words.

The list of unique words 12 of FIG. 1 is generated as input to the next step, the Relevant Word Table Generator 106. Depending on the size of the database, the list may have a few hundred or a few thousand words.

Relevant Word Table Generator, 106/Word Processor 15

Figure 3:
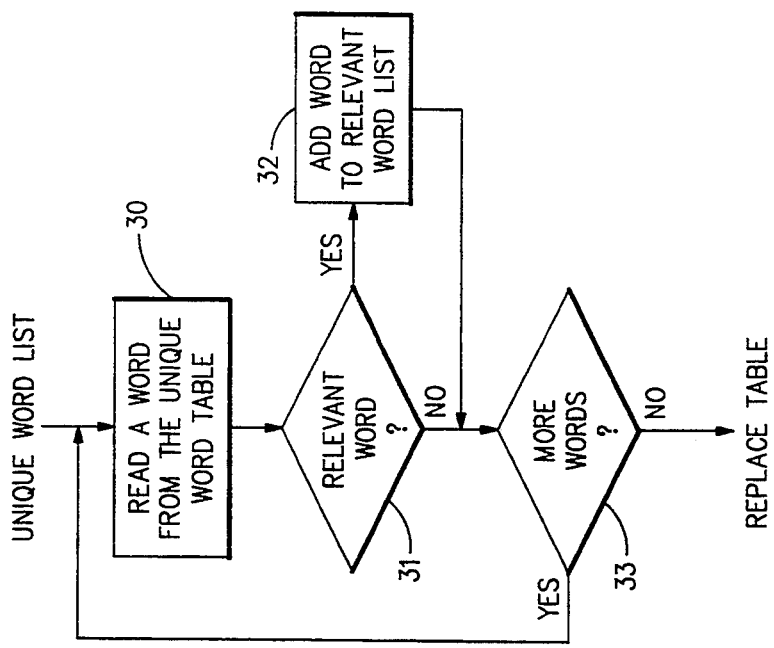
FIG. 3 shows a Replace Table Generator which we employ.
Figure 4:
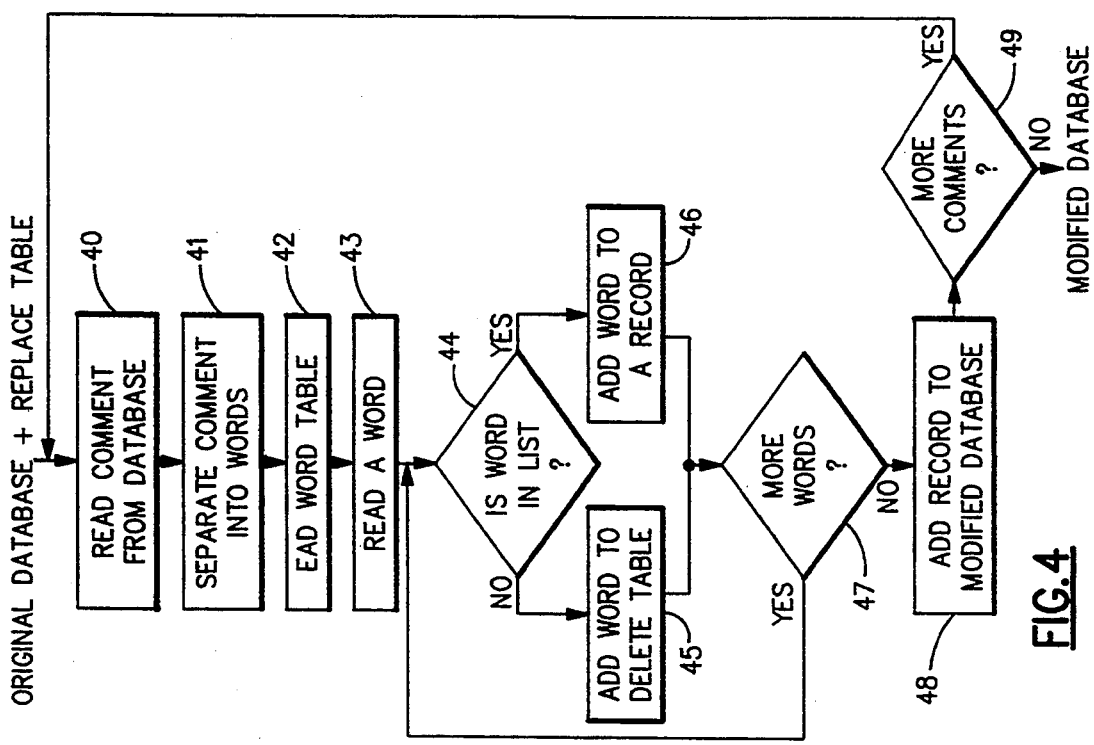
FIG. 4 illustrates the Generation of the modified database.

The Relevant Word Table Generator 106 whose operation is described in FIGS. 3 and 4, requires the manual processing of the words 13 and the automatic examination of the database by the Word Processor 15. During the manual process 13 with the operation shown in blocks 30 to 33 of FIG. 3, the list of the unique words 12 generated by the Unique Word Generator 11 is analyzed in order to extract and place potential "relevant" words in a table which is referred to as the replace table 14.

During this process the user of our tool reads a word of the unique list 30 and decides if the word is likely to be used to describe the subject in which he/she is interested. If a decision is made to keep the word (decision block 31), then the user saves this word in a file referred to as the "relevant word list", as shown in block 32. Otherwise, he discards the word.

The replace table 14 contains two columns, one with the words as they appear in the database and the other with the synonyms that correspond to the words in the first column. This allows for illegitimate words, such as misspelled words, acronyms, etc., to be properly substituted in the database. For example, if ERROR and FIX are considered relevant words, then EROR can be substituted by ERROR and FIXED by FIX. During the automatic processing, which is shown in FIG. 4, the comments of the original database are read by the word processor 15 (block 40 of FIG. 4). Each comment is broken into words by block 41, and then the word table is read by block 42. Block 43 reads a word from the list generated in block 41 and searches the word table to find the word. If the word is found in the first column of the replace table, then decision block 44 transfers control to block 46 which reads the word from the second column of the replace table and adds that word to a new comment generated at that point. If the word currently examined is not found in the first column of the replace table, then block 44 transfers control to block 49 which saves the word in a table called the delete table, 17. Decision block 45 checks for more words in the current comment, and if it finds words it transfers control to 43; but otherwise it transfers control to block 47 which saves the comment created in 46 into a file. Decision block 48 checks for more comments in the original data base.

If the user of the tool feels that the replace table needs more information, then s/he may repeat the process shown in FIG. 3 to enhance the information in the replace table. As a result of the above analysis, new "comment records" are generated, and a second database is established. This database, which is referred to as the modified database 16, contains the words that are only present in the replace table 14. Using the Unique Word Generator 18 and operating on the modified database 16, the list of all unique words in the modified database is generated, and it is referred to as the relevant word table, 18.

The frequency of each unique word, generated in the previous step, is used to identify the words that are most commonly used throughout the database. This may be a decision factor to include words that are suspected to be relevant to the subject of interest. The process of generating the modified database may result in some data loss. A number of records may end up having zero relevant words. The statistics generated by the Unique Word Generator (block 28 of FIG. 2) and the frequency of each word may be used, in this case, to decide if this data loss is acceptable or to add more words into the relevant word table.

It was found during the analysis of the bookkeeping libraries that inclusion of many low-frequency words did not substantially improve the percentage of database that was lost.

The Exped Interview Evaluation Process Step, 101

An interview step 101 is part of the semi-automatic system we describe. After the relevant word table is generated by the unique word generator 18, it is distributed to personnel who are considered to be "expert" in the subject under investigation and possibly to members of the group who created the database in order to construct membership grades for each word in the relevant word table. Survey participants are asked to attribute a confidence value for every word that reflects their perception of the usage of that word with respect to the subject of interest. In other words, the confidence value indicates how a person perceives that a particular word is most likely used in the comment field of the database.

The answers to the surveys are then scaled with a maximum value equal to one in order to apply these values in constructing the membership grades for the words in the relevant word table. This process is shown in block 101 of FIG. 1.

The FEV Processor, 102

After the interviews the scaled answers of the surveys are evaluated and a membership grade is assigned to each word in the relevant word table. Such a task is achieved by establishing the fuzzy expected value for each word. The FEV (Fuzzy Expected Value) processor reads the scaled responses of the interviews and assigns a membership grade to each word in the relevant word table. The membership grade is obtained by taking the average of all responses generated during the interviews. The membership grade of each word is stored in the relevant word table next to the word, shown as block 103 in FIG. 1.

The Fuzzy Evaluator 104, and Results Analyzer 105

Figure 6:
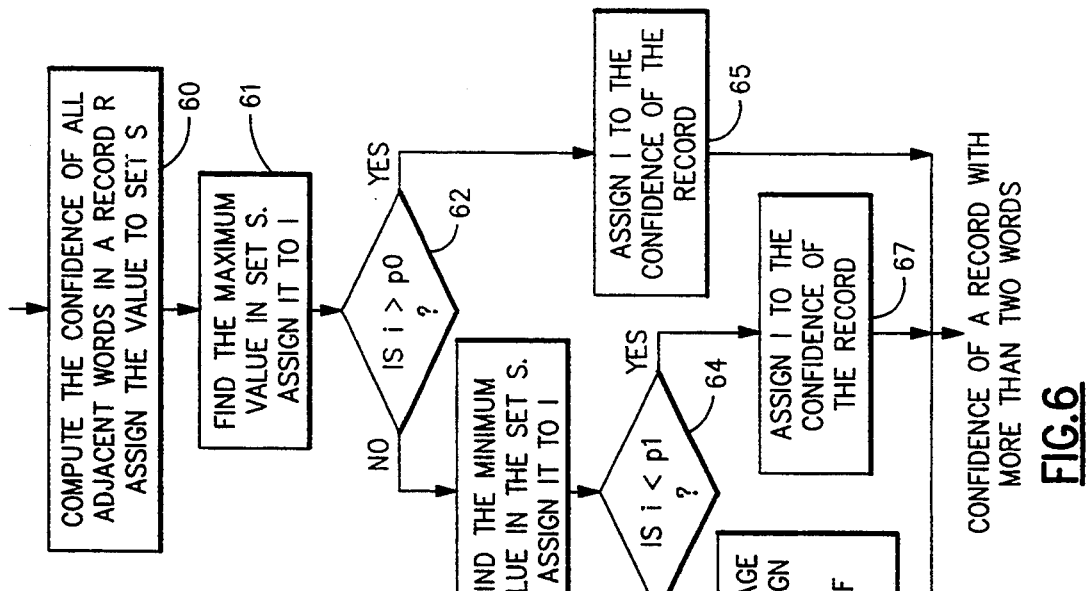
FIG. 6 illustrates the Confidence of a record with three or more words.
Figure 5:
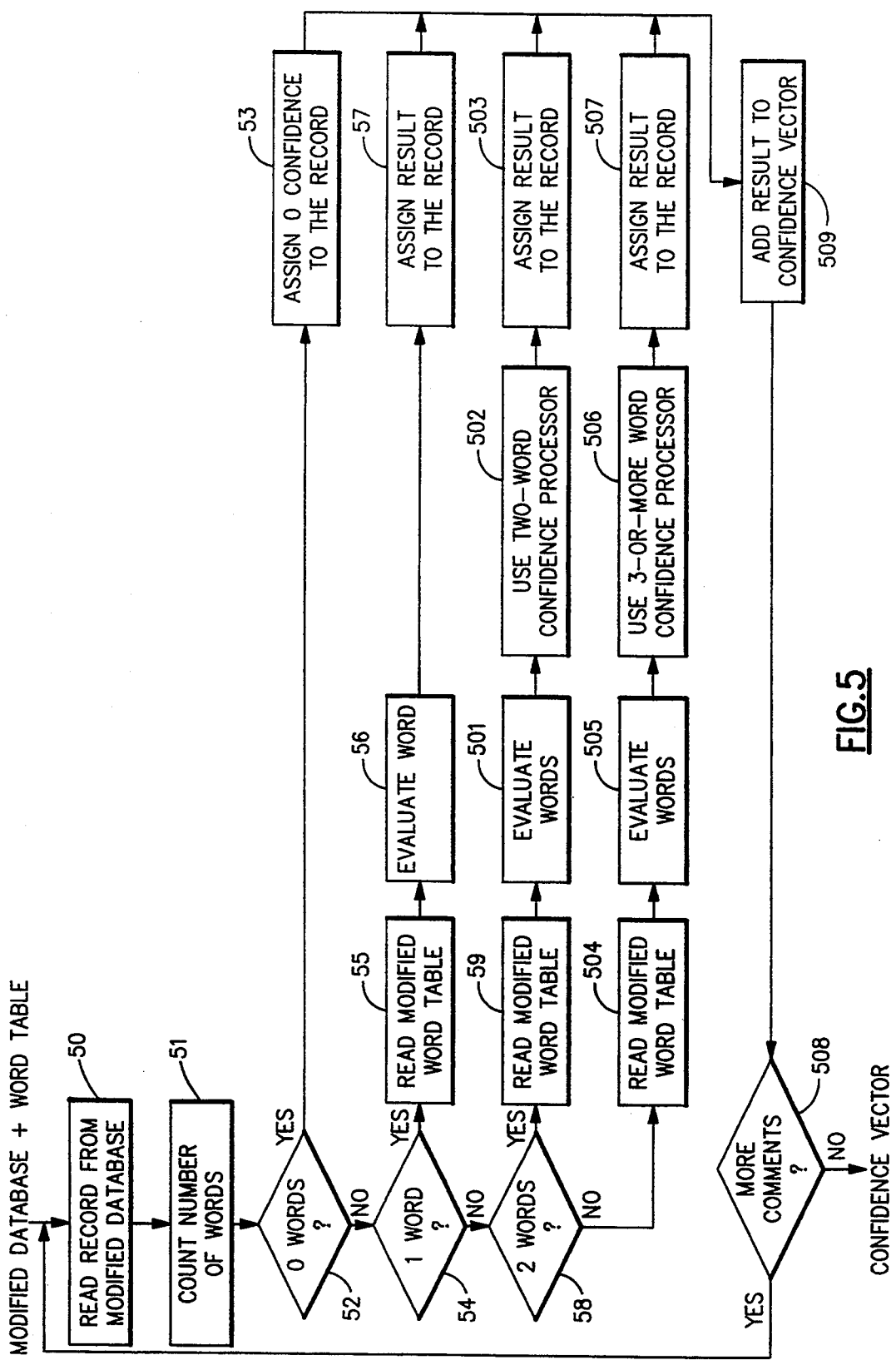
FIG. 5 shows the Fuzzy Evaluator which we employ.

FIG. 5 and FIG. 6 show the block diagrams of an apparatus denoted as fuzzy evaluator which is described below. Block 50 of FIG. 5 reads a comment from the modified data base generated by the apparatus of FIG. 4 and passes it to block 51 which counts the number of words in the given comment. The comment may contain zero or more words, as previously explained. If there are zero words in the given record, then decision block 52 transfers control to block 53 which assigns the value zero to a temporary variable. If decision block 52 finds words in the record, it transfers control to decision block 54. If there is only one word in the given comment decision, block 54 transfers control to block 55 which reads the relevant word table from an ASCII file and passes control to block 56. Block 56 locates the word in the word table and reads the corresponding confidence value from the table and passes it to block 57. Then, block 57 assigns the confidence value to a temporary variable. If decision block 54 finds more than one word in the comment, it transfers control to block 58. If there are two words in the comment, then block 58 passes control to block 59 which reads the relevant word table from an ASCII file (block 103 of FIG. 1) and passes control to block 501. Block 501 locates the two words of the comment in the relevant word table (103) and reads the corresponding confidence values from the table. It then passes the two values to block 502. Block 502 uses function (1), which we invented and is described below, to calculate a joined confidence value for the comment and to store it in a temporary variable. If the comment read has more than two words, then decision block 58 branches to block 504 which reads the word table from the file and passes it to block 505. Block 505 locates all words of the comment in the table and reads the corresponding confidence values. It then passes these values to block 506, whose operation is shown in FIG. 6 and will be further explained below, to calculate a confidence value for the case of three or more words. Block 506 passes the result to block 507 which stores it in memory and transfers control to block 509. Block 509 stores the result of the comment evaluation in a text file, one value per line. It then passes control to decision block 508 which checks for more comments in the input data base and transfers control to block 50 if there are more comments; but otherwise it terminates.

A detailed description of block 506 (FIG. 6) may be found in a later section.

In describing the fuzzy evaluator of FIG. 5, it should be stated that while the design of the system has been targeted to a particular subject of interest, it can be applied with small modifications in a variety of applications provided that the fundamental assumptions underlying its implementation are granted. The section of the system that requires modifications pertains to the selection of the words that are pertinent to a particular application (denoted as block 13 in FIG. 1) and the interviewing of expert personnel in order to attribute the membership grade values to the relevant words (denoted as block 101 in FIG. 1).

Our first observation is that the system does not deploy syntactic and semantic rules, and it operates on modified comments that contain partial description of the original comments. A key question which arose before the development of our tool and the verification of its validity is why such a system operating on partial description of comments (implying among other things, loss of structure, word association and meaning) may be considered as promising. An intuitive justification for the possible "goodness" of this approach is the following:

Comments are not written at random and reflect the intentions of the commentator.

Comments are short; consequently they most likely reflect what has happened or accomplished with very few key words.

Most likely comments reflect what happened or what was accomplished rather than what did not happen or was not accomplished, i.e. most of the times there are no negative statements.

A comment will most likely reflect a single or a plurality of relevant/irrelevant actions during a database access rather than a plurality of irrelevant actions intermingled with relevant actions.

(Here it may be noted that the principle of a single or a plurality of relevant/irrelevant actions is referred to as the "single action principle" in the remaining presentation).

A consequence of the previous justification statements is that the intentions of a comment can be captured with few words, and the actions associated with a database access can be extrapolated without having to comprehend the exact contents of a comment. Obviously, the precise actions cannot be associated with a comment (such a determination may require the context in which the words appear among other things); however, this may not be a requirement when the intention of the examination is not the determination of a particular cause but rather the relationship of a comment to a subject of interest. For example, in examining a bookkeeping library in order to establish its pertinence to functional testing and to extrapolate the comments that are related to this subject, it is required to establish whether the comments in this library are related to functional changes in general rather than the exact nature of changes that might have occurred in a particular piece of logic or microcode. The previous discussion leaves open the question of having to find the precise cause of a change. To develop algorithms regarding system testing, precise causes of the changes may be considered irrelevant if it is of interest to identify the number of errors, when they occur, the part of the machine where they occurred, etc., rather than to establish whether changes were due to the wrong polarity of a signal, the wrong implementation of microinstructions, etc. Consequently, the drawback of the proposed system may not be of any importance to the overall results.

However, while some applications may not require establishing the exact reason of an action, there may be other circumstances in which such a capability is highly desirable. In such a case, the proposed system can be used only as an indicator by establishing whether a database is relevant to a subject of interest and for determining which entries can be discarded. Consequently, in these circumstances we would provide a tool, such as a natural language question answering system, which can be applied for further investigations.

If there are two words in a comment record, the confidence values of the two words are put together, block 502 of FIG. 5, based on the following discussion. For simplicity of exposition, analogous conclusions can be derived for pertinent cases. Assume that a database is suspected to contain information pertinent to functional testing. In essence, assume that the database comments are suspected to report logic changes, etc. Furthermore, assume that the words in the relevant word table, 19, are:

---
ERROR/0.8
BUG/0.9
FIX/0.8
UPDATE/0.5
COMMENT/0.1
SYNTAX/0.1
---

(where X/y indicates the pair, a significant word X with confidence value y). Additionally, assume that there are only two words appearing in the modified database and that there are the following five comments:
1. <SYNTAX, ERROR>
2. <COMMENT, SYNTAX>
3. <UPDATE, COMMENT>
4. <FIX, UPDATE>
5. <FIX, BUG>

Attributing a degree of confidence to a comment may be interpreted to require the use of an AND operator between the two degrees of confidence of the single words. There are three popular AND operators, namely, the Min operator, the Product operator and the Bounded Sum operator described by M. Smithson in his book *Fuzzy Set Analysis for Behavioral and Social Sciences*, published by Springer-Verlag Inc, in New York, 1986. FIG. 7 reports the confidence values for all records using the three operators.

The Min operator definition implies that when a pair of words is examined, then the confidence associated with the pair needs to be the minimum confidence of the two words. It can be contended that the confidence value 0.1, given by the Min operator to the first comment is close to the mark or is a bit pessimistic because it indicates that the record does not report a substantial change, that is, if it is assumed that the "syntax error" in question is considered to be a "trivial fix". Additionally, under such an assumption, it can stated that any scheme that produces a confidence value that does not exceed 0.5 (0.5 being the "indifference" point), will be close to the mark. In other words, an acceptable confidence value for the first comment can be the Min value, or an increase of the Min value, but not to the point that exceeds 0.5. The confidence value 0.1 given by the Min operator to the second comment may be considered to be overly optimistic because both words indicate that there is a trivial fix. Were it otherwise, the words BUG, FIX or ERROR would have to be present as well, and consequently the confidence attributed to the pair <COMMENT, SYNTAX> should have been decreased. It needs to be noted that while both the first and the second comment may be viewed as non substantial changes, the first comment should have a confidence value greater than the second because of the presence of the word ERROR. The confidence attributed to the third comment may be considered as either correct for the same reasoning as in comment one or a bit overly pessimistic. The confidence attributed to the fourth comment may be considered overly pessimistic because the fourth comment may refer to an update due to a problem, more than to an irrelevant update. Consequently, the confidence value should be closer to 0.8 rather than 0.5. Finally, the confidence value 0.8, attributed to the pair <FIX, BUG> may not be considered as representative of the comment because in this case the confidence of a change should be reinforced rather than associated with the lowest value. In other words, the presence of the words "FIX" and "BUG" provides more confidence that a change has been reported than would be the confidence of any of the two words alone. In such a case, the confidence should be greater than at least 0.8, and even greater than 0.9.

The Product operator will produce the confidence value of a pair with the multiplication of the two confidences. The discussion regarding the Min operator also applies to the Product operator with the additional observations that the Product operator performs better than the Min operator for comment 2, and worse for all the other comments.

Finally, the Bounded Sum operator will produce the confidence value by max $[0,(\mu_x+\mu_y-1)]$, with $\mu_i$ denoting the confidence value attributed to word i. Such an operator may be considered as overly pessimistic for all comments.

Three AND operators may not be appropriate for attributing a confidence value for the given circumstances. This may be attributed to the following observations:
1. If the two words are favorably associated with the subject of interest and appear in the same sentence, they most likely reinforce the confidence that the sentence describes the subject of interest. Thus, the resulting confidence should be "closer" to the maximum, and possibly exceeding the maximum value, when the confidence of a word or both words get "closer" to a certain "association" value.

2. If the two words are both adversely associated with the subject of interest, then the comment in which these two words appear, most likely, does not describe the subject of interest. Thus, the confidence of the two words should be "closed" to the minimum and possibly less than the minimum value as the two confidence values get "closer" to a certain "disassociation" value.

3. If two words have the cutoff value, i.e. if both words are neither associated with the subject of interest nor disassociated, then their combined confidence should be the cutoff value itself.

4. Excluding the cases of certainty of association and disassociation, which will be addressed in the later part of this section, if one word is unfavorable and the other is favorable, then in the case where one word is strongly unfavorable, as in comment 1 in the assumed example, the confidence value of the comment should be "closer" to the minimum value. Otherwise, it should be "closer" to the maximum value. The previous statement may appear to be on the extreme side; however there is an intuitive justification for it. We "know" that a word strongly disassociated from the subject of interest paired with a word associated (even strongly associated) with the subject of interest "reinforces" somehow the disassociation rather than the association and the other way around. For example, the words SYNTAX and COMMENT when paired with the words ERROR, BUG, etc. most likely indicate that there is a trivial fix rather than a substantial fix.

The previous discussion indicates that a membership function needs to be provided that can closely reflect the previous four observations. In search of such a membership function, we established that such a function is somehow related to the average of the confidence values attributed to the two words.

However, as it can be observed in FIG. 7, while the average represents to a degree the confidence associated with a comment, it can only be used as a first approximation, and it requires an adjustment to produce a more accurate confidence value. The following discussion describes a membership function that produces an adjusted average which better approximates the previous observations:

Let $\mu_A(w_i, w_j)$ be the membership function attributing a degree of confidence with regards to a subject of interest A for a comment, where $w_i$ and $w_j$ are the confidence values associated with two individual words i and j appearing in the same comment, then $\mu_A(w_i, w_j)$ can be computed by:

$$\mu_A(w_i, w_j) = \frac{1}{1 + ce^{-k(w_i w_j - l^2)}} \quad (1)$$

where k is a constant greater than 0, $$c = \frac{1-m}{m}, \ m \text{ being } m = \frac{w_i + w_j}{2},$$

i.e. the average confidence of the two words i and j, and l, which is $0 < l < 1$, indicates the following: Words r that have confidence value $w_r > 1$ are considered to favorably describe the subject of interest, while words with $w_r < 1$ are considered to adversely describe the subject of interest, and words with $w_r = 1$ are considered to be "neutral".

Figure 8:
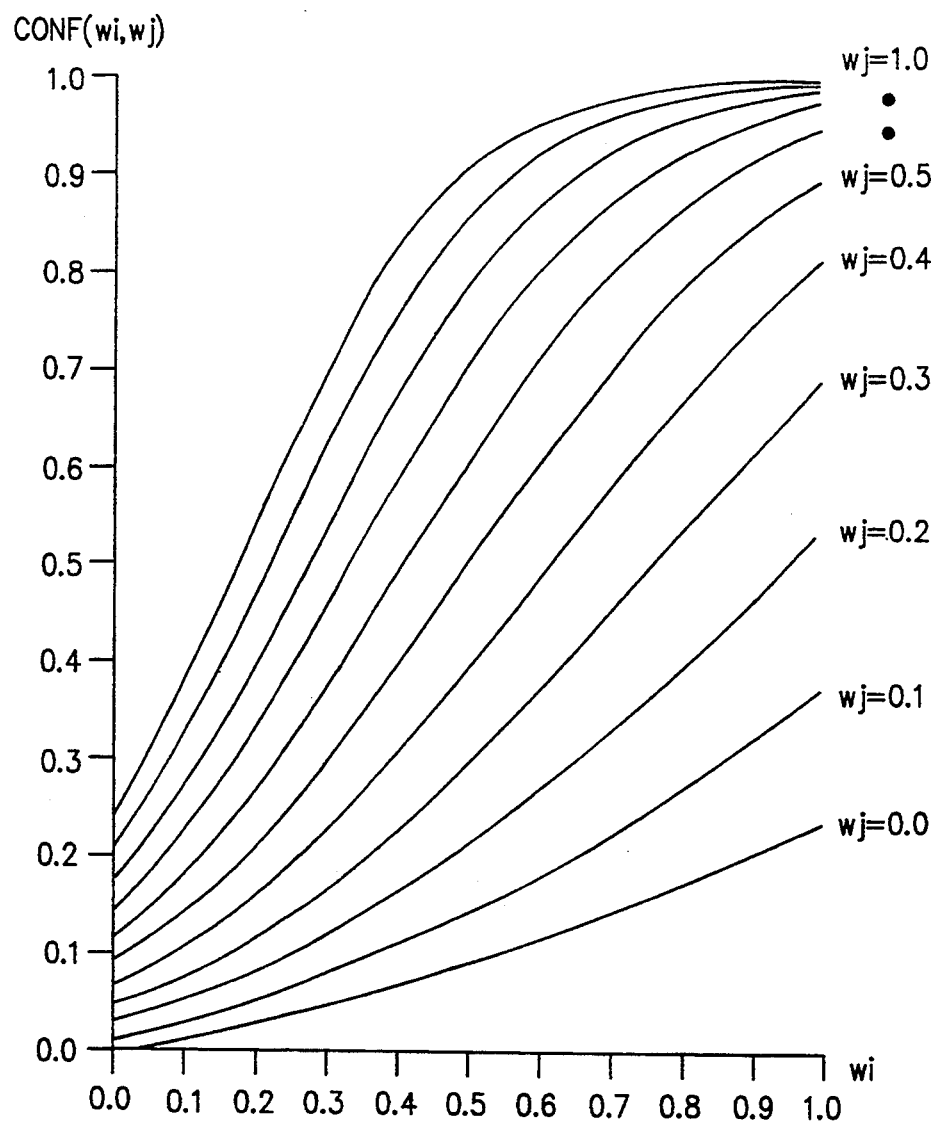
FIG. 8 illustrates the Membership Function for Pairs of Words.

Equation (1) described in FIG. 8, and the values for the comments of the assumed example database in FIG. 7 with l=0.5, k=4.5, is based on the solution of the logistic growth deferential equation. Note that similar functions (2.1), (2.2) have been used in other schemes, i.e. "On the Precision of Adjectives which Denote Fuzzy Sets" by M. Kochen and A. Badre published in the Journal of Cybernetics, Vol. 4, No. 1, January 1974 and "Modelling Membership Functions" by P. Zysno published in Empirical Semantics, Vol. 1, in January 1981.

$$f_L(x) = \frac{1}{1 + e^{a-bx}} \quad (2.1)$$

$$m_s(x) = \frac{1}{1 + e^{-a(x+b)}} \quad (2.2)$$

However, as it can be easily verified, both functions (2.1) and (2.2) are different than (1).

Properties

Some of the properties of the membership function are the following: Assume, for simplicity of notation, that $w_i$ is equal to x, $w_j$ is equal to y, and $\mu_A(w_i, w_j) = \mu(x, y)$, then the membership function can be written as:

$$\mu(x, y) = \frac{1}{1 + ce^{-k(xy - l^2)}}$$

• Property 1: if $x = y = 0 \rightarrow \mu(x, y) = 0$ proof:

$$\mu(x, y) = \frac{1}{1 + ce^{-k(xy - l^2)}} = \frac{1}{1 + \frac{1-m}{m} e^{kl^2}} =$$

$$\frac{1}{1 + \frac{1-0}{0} e^{kl^2}} = \frac{1}{1 + \infty} = 0$$

• Property 2: if x and $y > l \rightarrow \mu(x, y) > \frac{x + y}{2}$ proof: x and $y > l \rightarrow xy > l^2$. Let $\xi > 0$, and $\zeta > 1$ then $$\mu(x, y) = \frac{1}{1 + ce^{-k(xy - l^2)}} = \frac{1}{1 + ce^{-k\xi}} = \frac{1}{1 + \frac{c}{e^{k\xi}}}$$

$$= \frac{1}{1 + \frac{c}{\zeta}} = \frac{\zeta}{\zeta + c} = \frac{\zeta}{\zeta + \frac{1-m}{m}} = \frac{\zeta m}{\zeta m + 1 - m}$$

it must be that, $$\frac{\zeta m}{\zeta m + 1 - m} > m \rightarrow \zeta m > m(\zeta m + 1 - m) \rightarrow$$

$$\zeta > \zeta m + 1 - m \rightarrow \zeta - \zeta m > 1 - m \rightarrow \zeta(1 - m) >$$

$$1 - m \rightarrow \zeta > 1 \ Q.E.D.$$

• Property 3: if x and $y < l \rightarrow \mu(x, y) < \frac{x + y}{2}$ proof:
x and $y < l \rightarrow xy < l^2$. Let $\xi < 0$, $\omega > 0$, and $\zeta > 1$, then -continued $$\mu(x,y) = \frac{1}{1 + ce^{-k(xy-l^2)}} = \frac{1}{1 + ce^{-k\xi}} = \frac{1}{1 + ce^\omega}$$

$$= \frac{1}{1 + c\zeta} = \frac{1}{1 + \frac{1-m}{m}\zeta} = \frac{m}{m + (1-m)\zeta}$$

It must be that, $$\frac{m}{m + (1-m)\zeta} < m \rightarrow m < m(m + (1-m)\zeta) \rightarrow 1 < m +$$

$$(1-m)\zeta \rightarrow 1 - m < (1-m)\zeta \rightarrow 1 < \zeta \, Q.E.D.$$

- Property 4: if $x = y = l \rightarrow \mu(x,y) = l$
  proof:

$$\mu(x,y) = \frac{1}{1 + ce^0} = \frac{m}{m + 1 - m} = m = \frac{l+l}{2} = l$$

- Property 5: if $x$ or $y < l$ and $xy > l^2 \rightarrow \mu(x,y) > \frac{x+y}{2}$
  proof: analogous to property 2

- Property 6: if $x$ or $y < l$ and $xy < l^2 \rightarrow (x,y) < \frac{x+y}{2}$
  proof: analogous to property 3

- Property 7: if $x = y = 1 \rightarrow \mu(x,y) = 1$
  proof: trivial ($m = 0$ and $\mu(x,y) = 1$)

Properties 2 and 3 reflect observations 1 and 2 because they attribute confidence values always toward the maximum and minimum confidence value of the word pair respectively. Properly 4 closely reflects observation 3. Properties 5 and 6 reflect observation 4 as FIG. 9 suggests. In FIG. 9, it is assumed that the confidence values x and y can take values between 0 and 1 with a 0.1 increment, and it indicates that when a confidence value of a pair of a words is strongly disassociated from the subject of interest (the x values 0.1 and 0.2), then a confidence value attributed to the pair is always closer to the value of x rather than the value of y. When they are disassociated, but not "strongly", then for strongly associated values of y, such as 0.9 when x=0.3, the confidence value of the pair becomes closer to the association rather then the disassociation.

Properties 1 and 7 indicate that the boundary conditions are respected; however, we recognize that the membership function, as described by Equation (1), may not be good enough to guarantee "correct" values for all possible boundary conditions. In essence, when one of the confidence values, but not both, are different than either 1 or 0, then the membership function described in Equation (1) will provide an "in between" value, and such a value may not be considered as proper. If it is assumed that certainty for association and disassociation from the subject of interest is described by the values 1 and 0 respectively and that the presence of a word with such confidence values, independent of the confidence value of the other word is prevalent, then Equation (1) will not compute the correct value for a pair of words, and needs to be adjusted to express such a prevalence.

It need to be noted that the previous discussion leaves open the question of one word having a value equal to 1 and the other equal to 0. If it is assumed that a comment can not be "contradictory", then each word must represent two different scenarios, one that indicates relevance and another indicating irrelevance, implying that in such a case the resulting confidence value should be equal to 1.

In essence, in the assumed example database, if there is a word that indicates that the comment reports a definite change and the other word indicates a definite no-change, then we assume that there are two different actions present in the comment and that definitely a change is reported. The previous discussion can be incorporated in the two following complementary statements:

If either $w_i$ or $w_j$ is equal to 1, then $\mu_A(w_i, w_j) = 1$

If either $w_i$ or $w_j$ is equal to 0 and the other is different than 1, then $\mu_A(w_i, w_j) = 0$ FIG. 10, and FIG. 11 report two examples of pair membership values using k=1 and l=0.5, and k=4.5 and l=0.5 respectively that incorporate the two complementary statements.

If the modified database comment contains more than two words, then the confidence value associated with the comment may be computed by the following algorithm, shown in block 506, of FIG. 5. A detailed flow chart is shown in blocks 60 to 67 of FIG. 6.

If a comment contains n relevant words, its confidence value can be attributed by applying $$\overset{n-1}{\underset{i=1}{\Phi}} \mu_A[(w_i, w_{i+1})]$$

to the confidence values of the words present in a comment. The operator $\Phi$, for any given i, applies Equation (1) with possible inclusion, if considered appropriate, to the two complementary statements presented previously. The inputs to Equation (1) are the confidence values attributed to words i and i+1, and the final output value of $\Phi$ for all is between 1 and including n−1 is a set of confidence values. Consequently, a confidence value is attributed to the comment by applying the following algorithm.

Step 1: If there exists at least one element in the set produced by $\Phi$ that exceeds a threshold value $\rho_0$, (decision block 62 of FIG. 5), then the confidence value of the comment is assumed to be the MAX confidence value present in the set (block 65 of FIG. 5).

Step 2: If step 1 does not hold true, then if there exists at least one element in the set produced by $\Phi$ less than a threshold value $\rho_1$ (decision block 64 of FIG. 5), then the confidence value of the comment is assumed to be the MIN confidence value present in the set (block 66 of FIG. 5).

Step 3: If neither step 1 nor step 2 holds true, then the confidence value of a comment is assumed to be equal to the average of confidences (block 67 of FIG. 5).

Before proceeding in the detailed explanation of the previously described algorithm the two new variables, $\rho_0$ and $\rho_1$ need further explanation because they play an important part in the question answering system.

In order to assess the pertinence to a subject of interest of a database, and more importantly to distinguish which records should ultimately be kept for the development of algorithms and further investigations, in our preferred embodiment we establish thresholds. As mentioned previously (in the description of the system), the output of the fuzzy evaluator is the confidence vector which is the input of the confidence analyzer. Given that the confidence vector contains values between 0 and 1, for the confidence analyzer to be able to exclude unacceptable records and answer questions, cut points which group the records into distinct sets are required. If for example, we assume that three regions are needed for the investigation denoting definite relevance, definite irrelevance to the subject of interest, and indecision, then two values are required. The first one, denoted by $\rho_0$, determines the acceptable degree of relevance and is used as the lower bound of its inclusion, and the second one, $\rho_1$, is used as the upper bound of inclusion of irrelevance. For example, if we assume $\rho_0=0.66$ and $\rho_1=0.33$, then records having in the confidence vector a value less than 0.33 are considered as irrelevant to the intended application. Records having values between the bounds, e.g. between 0.33 and 0.66, are considered as uncertain what they are, as they may be either relevant or irrelevant. Records with confidence values greater than 0.66 are considered as relevant to the application. This is only one possible scenario and by no means the only one. It is entirely possible that only one value is required that distinguishes association from disassociation and in such a case $\rho_0=\rho_1$.

The algorithm presented previously that attributes a confidence value to a comment containing more than two words is based on the following observations.

1. The presence of at least a pair of words with a degree of confidence greater than $\rho_0$ indicates that in the case such a pair of words is "related", a relevant action to the subject of interest occurred regardless of the other actions.
2. If there is no pair of words that exceed $\rho_0$, then in case that there exists at least one pair of words with a degree of confidence less than $\rho_1$, such a pair indicates that if the words constituting the pair are associated in the comment, then an irrelevant action to the subject of interest occurred regardless of the other actions.
3. Finally, if none of the above scenarios holds true, then all of the pairs indicate indecision, and the average may be considered as the most representative value of confidence for the comment.

It can be observed that the previously reported algorithm tends to produce confidence values to the extremes rather than taking into account possible association of words and that it has an "optimistic" tendency. It can be argued that because association of words can not be extrapolated, the success of the algorithm for more than two relevant words may not be granted. We recognize that such argumentation to a certain extent is valid.

Additionally, we recognize that the proposed system can not always replace a natural language question answering system. Nor it is intended to. Furthermore, even if the algorithm tends to be rather "optimistic", and even if it is assumed to be not very successful for all comments, this should not impact to a great extent the overall performance of the tool in case the frequency of comments that contain more than two relevant words is low. Further discussion and results of the analysis regarding this subject are reported in the evaluation section.

In addition to the selection of records presented previously and their use to answer some questions regarding a database under consideration, the result analyzer can be used to produce other useful work, such as how many comments exceed a pre-specified degree of confidence and a confidence value for the entire database which can be computed by Equation (3) (i.e. the average of the confidence values).

$$\mu_A(X) = \frac{\sum_{i=1}^{n} \mu_A(r_i)}{n} \quad (3)$$

(Where X represents the entire database and n is the number of records in the database.)

Preferred: Clustering Fuzzy Expected Value System

The overall design of the proposed system is shown in its preferred embodiment in the drawings for the system illustrated by FIG. 12. The system comprises:
The Cluster Generator, 10, further illustrated by FIG. 13;
The computation of the mean, 11; and
The computation of the CFEV, 12.

Details of the preferred embodiment of our improvement which can be used in the question answering system illustrated by FIG. 1 can be found in the cluster generator 10.

The Cluster Generator

The Cluster Generator 10, which is described in more detail in blocks 20 through 25 of FIG. 13, analyzes and groups the data into clusters, such that the membership grades in the same cluster are closely associated. The clustering of membership grades is based on two parameters, "s" and "d." Where, "s" is the maximum allowable distance between the first and last elements in a cluster; it serves as a measure of the size of a cluster by controlling the range of the data. The "d" value is the maximum allowable distance between two consecutive elements within a cluster; it is a measure of the closeness of the elements within a cluster.

Both, "s" and "d," serve as the cut-point for establishing the gaps between clusters. The elements of the formed clusters are confined to the following two inequalities.

$$|C_{ij-1} - C_{ij}| < d \text{ (gap)} \quad (3)$$

$$|C_{i,1} - C_{i,n}| < s \text{ (size)} \quad (4)$$

In the Inequalities (3) and (4), $C_{ij-1}$ and $C_{i,j}$ are two consecutive elements in cluster i, and $C_{i,1}$ and $C_{i,n}$ are, respectively, the first and last elements in cluster i. The clusters are formed by applying the steps:

Step 1: Select the "s" and "d" values.
Step 2: Cluster the elements within the fuzzy set based on the "d" value, i.e. select consecutive elements into a cluster in a manner that satisfies Inequality (3).
Step 3: If the first and last elements of the formed cluster satisfy Inequality (4), the cluster qualifies, and the process is completed if there are no more clusters to be formed. Otherwise, if there are more clusters to be formed, go to step 2. If the formed cluster does not qualify, proceed to step 4.
Step 4: In the non-qualifying cluster, apply the Group Division Algorithm.

Block 20 of FIG. 13 sorts all numbers in ascending order and stores the numbers in a list. Block 21 of FIG. 13 starts searching the list, produced in block 20, for consecutive numbers that differ by more than "d" as described in FIG. 14. For each group of data produced, block 21 transfers control to block 22 which checks the resulting group to determine if it is acceptable. Block 22 uses equation (4) to determine if the group is within the limits set by the user. If length of the group is smaller than "s" block 22 transfers control to block 23 otherwise it transfers control to block 24. Block 23 saves the group of data produced by block 21 in a cluster list and transfers control to block 25. Block 24 is activated by block 22 when the group of data produced by 21 does not meet the criteria set by equation (4). In this case, block 22 invoke the algorithm described in blocks 30 through 36 of FIG. 15.

Clustering the data, 21

Figure 14:
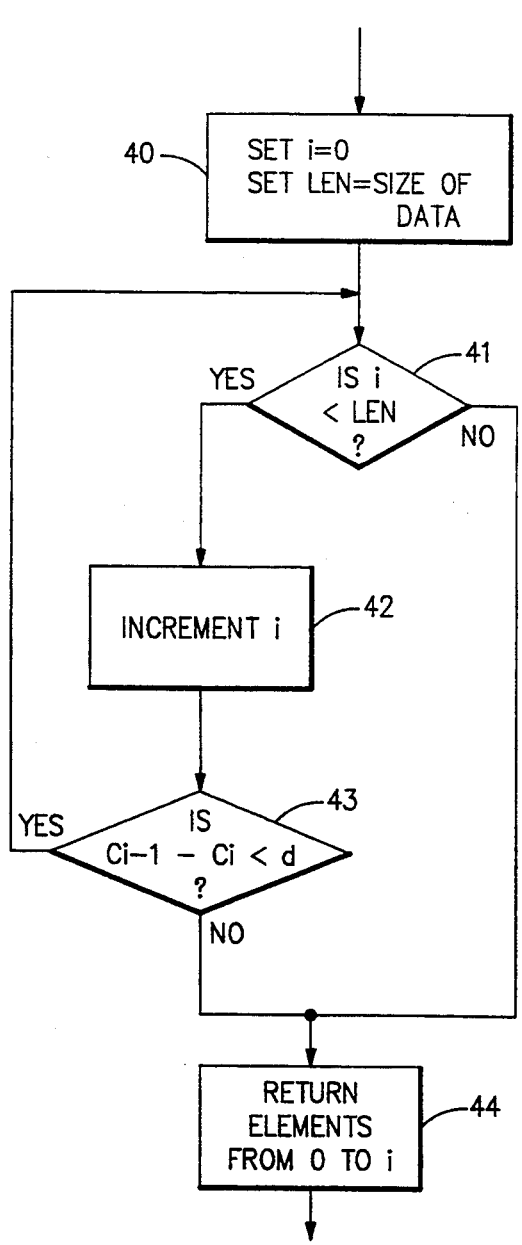
FIG. 14 illustrates details of the Cluster Generator we employ.

Block 21 of FIG. 13 is further described in blocks 40 through 44 of FIG. 14. The purpose of this step is to divide the set of data presented to this algorithm into a place where two consecutive elements of the data differ by more than "d". Block 40 of FIG. 14 sets the variable, i, to zero and the variable length to the number of elements in the data set. It then transfers control to block 41. Block 41 determines if the end of the process has been reached by comparing the value of the variable i to the value of the variable length, and transfers control to block 42 or block 44. If the variable i is less than the variable length then block 42 receives control and increments i by 1. It then transfers control to block 43. Block 43 examines two consecutive data elements pointed by the variable i, and denoted as $C_{i-1}$ and $C_i$ in FIG. 14, to determine if their difference in value is less than "d". If the difference is less than "d" block 43 transfers control to block 41, otherwise it transfers control to block 44. When block 44 receives control the variable i points to a place where the data set must be divided. Thus, block 44 extracts a group of data consisting from elements $C_0$ through $C_{i-1}$ and returns this group to block 21 of FIG. 13.

Group Division Algorithm, 24

A number of techniques may be used to sub-divide a cluster that does not satisfy Inequality (4). Some of these techniques may be the following:
1. Start from the left of the cluster and form smaller clusters that have size equal to s, satisfy Inequality (4)
2. Start from right of the cluster and form smaller clusters that have size equal to s, satisfy Inequality (4)
3. Break the cluster into two cluster at the point of the mean value. Apply the same rule on the sub-clusters until they all satisfy Inequality (4)
4. Choose a new d from the cluster and apply algorithm A again.

The above steps, however, do not always give the best answer. FIG. 16 shows a cluster, with elements denoted as {a,b,c,d,e,f,g,h,i,j}, that is bigger than the maximum allowable distance between the smallest and biggest element in the set (j−a>s). Looking into the cluster, it seems that the cluster should be broken into two clusters; {a,b,c,d,e,f} and {g,h,i,j}. These two groups seem to agree among themselves into the matter because there is a big distance between elements f and g. Methods 1, 2, 3 fail to group the data correctly as shown in FIG. 16(a), since they don't consider the "gaps" that may exist in the data. Method 4, gives the correct result in this case, but it fails s when the data is equally distributed in the set. For example the cluster (b) of FIG. 16 contains ten elements with equal distances between consecutive elements. In this case method 4 produces 10 clusters.

The optimum solution to subdivide a cluster that does not satisfy Inequality (3) is one that posses the following two properties:

1. Maximize the size of each cluster. Since all elements in the original cluster are closely associated, according to Inequality (3), the resulting clusters should have as many elements as possible.
2. Minimize the number of clusters; it follows from the previous requirement.

The following algorithm produces the best solution based on the above requirements.
1. Select a new value d' for the parameter d by taking the greatest distance between two consecutive elements of the set. (d'=max distance in data).
2. Divide the original cluster into subclusters using d' as the criteria.
3. For each sub cluster that does not satisfy Inequality (4) repeat steps 1 and 2.
4. Merge the resulting clusters to find all possible solutions that satisfy Inequality (3).
5. From all possible solutions produced in step 4 select the one that maximizes the following function:

$$\frac{\prod_{i=1}^{n} s_i}{n} = \max \tag{5}$$

where, $s_i$ is the size of cluster i (distance between the smallest and biggest number), and n is the number of clusters for each solution.

Figure 15:
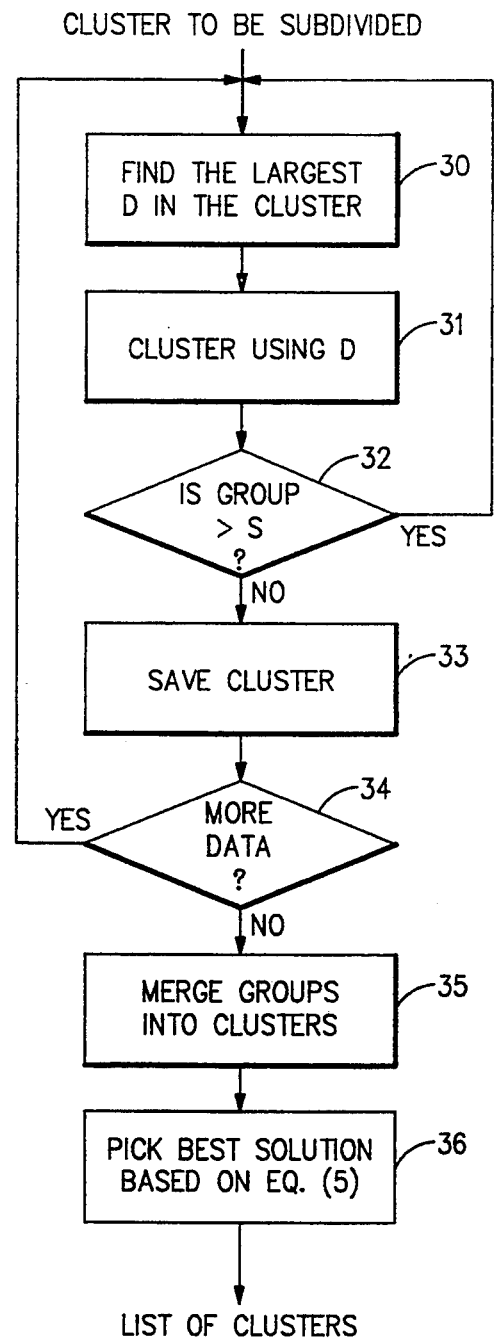
FIG. 15 illustrates the division of groups into clusters.

A flow chart of the above algorithm is shown in blocks 30 through 36 of FIG. 15. This algorithm works as follows: Block 30 finds the largest distance between any two elements in the group denoted as d' and transfers control to block 31. Block 31 clusters the data based on the new "d", d' by means of the algorithm shown in FIG. 14, and transfers control to block 32. If the size of the cluster produced by block 31 is greater than "s", block 32 sends this cluster to block 30 for further division, otherwise it transfers control to block 33. Block 33 saves the cluster produced by block 31 in the cluster list, and transfers control to block 34. Block 34 determines if there is more data to be clustered and if there is it transfers control back to block 30, otherwise it transfers control to block 35. Block 35 reads all clusters produced by 30 to 33 and and merges them together to form all possible combinations of groups of clusters whose size is less than "s". It then transfer's control to block 36. Block 36 reads the groups of clusters produced by 35 and applies the equation (5) on each group. The group that produced the maximum value for equation (5) is taken as the optimum group. Finally block 36 returns the clusters of the optimum group to block 24 of FIG. 13.

The Computation of the Mean, 11 Block 11 of FIG. 13 computes the average of the entire data set and the average of each cluster by applying the following equations:

When the clusters are formed, the mean or each cluster, $W_{Ai}$, is computed based on Equation (6).

$$W_{Ai} = \frac{\sum_{j=1}^{n} a_{ij} x_{ij}}{\sum_{j=1}^{n} a_{ij}} \tag{6}$$

In Equation (6), cluster i consists, respectively, of $a_{i1}$, $a_{i2}, \ldots, a_{in}$ observations, and have the data $x_{i1}, x_{i2}, \ldots, x_{in}$.

The mean of the entire fuzzy set is then computed by:

$$W_A = \sum_{i=1}^{m} \left( \frac{N_i}{N} \right) W_{Ai} \tag{7}$$

In Equation (7), m is the number of clusters in the fuzzy set, $W_{Ai}$ is the weighted average of cluster i, $N_i$ is the number of observations in cluster i, and N is the number of observations in the entire set.

The Computation of the CFEV, 12

Block 12 of FIG. 13 reads the list of clusters produced by block 10 and the mean for each cluster produced by block 11 and computes the CFEV of the entire data set by applying the result of (8). A detailed explanation of this step follows:

Based on the weighted averages and the number of observations of the entire fuzzy set and that of the individual clusters, the CFEV is represented as follows:

$$CFEV = W_A + \sum_{i=1}^{m} \left( \frac{N_i}{N} \right)^x (W_{Ai} - W_A) \tag{8}$$

In Equation (8), the mean of the entire fuzzy set is adjusted based on the population sizes and the weighted averages of the formed individual clusters. In this process, each cluster shifts the weighted average of the entire fuzzy set by a factor proportional to the distance between the weighted average of the cluster and that of the entire fuzzy set, and the ratio of the population size of the cluster and that of the entire fuzzy set. Thus, a cluster with a weighted average smaller than that of the entire fuzzy set reduces the weighted average of the fuzzy set by a factor proportional to the distance between the averages and the ratio of the population size of the cluster to that of the entire fuzzy set. On the other hand, a cluster with a weighted average larger than that of the entire fuzzy set increases the weighted average of the fuzzy set by a factor which is also based on the distance and ratio of the cluster and the fuzzy set.

EXAMPLE 5

Biggest cluster is above the mean

| i | μ(X_A) | n_i | p(x) |
|---|--------|-----|------|
| 1 | 0.50   | 5   | 0.24 |
| 2 | 0.80   | 10  | 0.28 |
| 3 | 0.30   | 6   | 0.48 |

EXAMPLE 6

Biggest cluster is below the mean

| i | μ(X_A) | n_i | p(x) |
|---|--------|-----|------|
| 1 | 0.90   | 3   | 0.11 |
| 2 | 0.10   | 15  | 0.52 |
| 3 | 0.60   | 6   | 0.20 |
| 4 | 0.80   | 5   | 0.17 |

Figure 17:
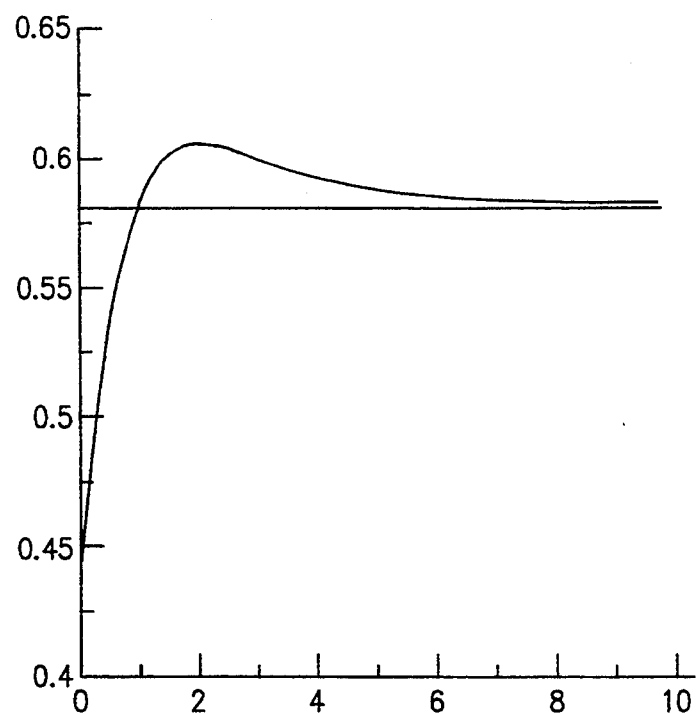
FIG. 17 shows the range of results produced by CFEV when the mean of the biggest cluster is below the mean of the entire set.
Figure 18:
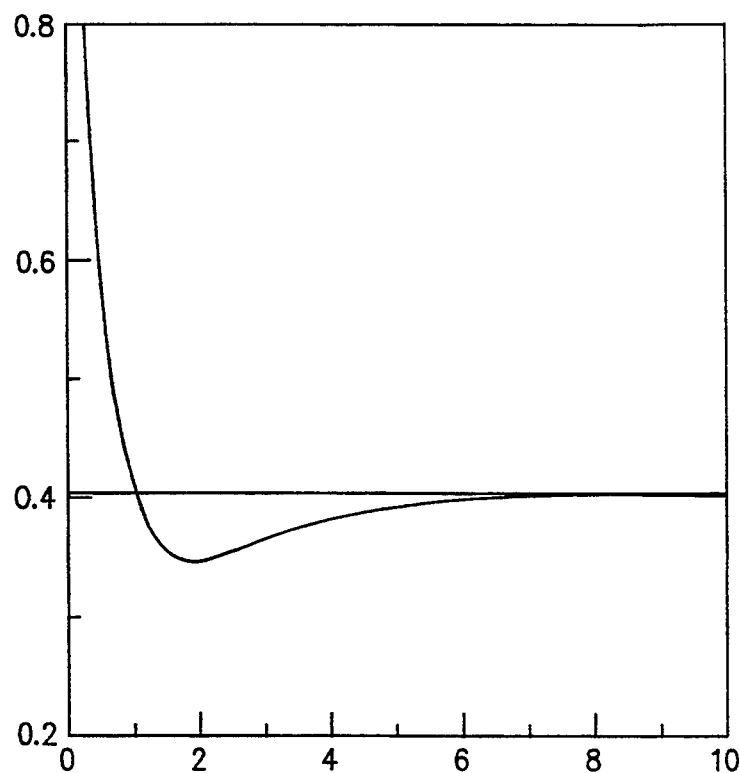
FIG. 18 shows the range of results produced by CFEV when the mean of the biggest cluster is above the mean of the entire set.

FIG. 17 shows the behavior of (8) for example #5, where the mean of the biggest cluster is greater than the mean of the sample. FIG. 18 shows the behavior of (8) for example #6, where the mean of the biggest cluster is smaller than the mean of the sample.

Assuming the data to be analyzed with CFEV represents a sample of membership grades, whose values are in the interval [0,1], the CFEV will always produce a result that is in the same interval. This is proven by the following theorem.

Theorem 1: $0 < CFEV \leq 1$

Proof:

Part A: It follows from Equation (8) that:

$$CFEV = W_A + \sum_{i=1}^{m} \left( \frac{N_i}{N} \right)^x (W_{Ai} - W_A) = W_A +$$

$$\sum_{i=1}^{m} \left( \frac{N_i}{N} \right)^x W_{Ai} - \sum_{i=1}^{m} \left( \frac{N_i}{N} \right)^x W_A$$

$$= \sum_{i=1}^{m} \left( \frac{N_i}{N} \right)^x W_{Ai} + W_A \left[ 1 - \sum_{i=1}^{m} \left( \frac{N_i}{N} \right)^x \right]$$

but, $$1 - \sum_{i=1}^{m} \left( \frac{N_i}{N} \right) \geq 0$$

therefore, $CFEV \geq 0$

Part B: From Equation (8), we have:

$$CFEV = W_A + \sum_{i=1}^{m} \left( \frac{N_i}{N} \right)^x (W_{Ai} - W_A) = W_A +$$

$$\sum_{i=1}^{m} \left( \frac{N_i}{N} \right)^x W_{Ai} - \sum_{i=1}^{m} \left( \frac{N_i}{N} \right)^x W_A$$

from Equation (7), $$CFEV = \sum_{i=1}^{m} \left( \frac{N_i}{N} \right)^x W_{Ai} + \sum_{i=1}^{m} \left( \frac{N_i}{N} \right) W_{Ai} - \tag{9}$$

$$\sum_{i=1}^{m} \left( \frac{N_i}{N} \right)^x \sum_{i=1}^{m} \left( \frac{N_i}{n} \right) W_{Ai}$$

Set $\sum_{i=1}^{m} \left( \frac{N_i}{N} \right)^x W_{Ai} = A$, and $\sum_{i=1}^{m} \left( \frac{N_i}{N} \right) W_{Ai} = B$.

For $A \geq 1$ and $B \geq 1$, we need to show that: $A + B - AB \geq 1$ (10)

Inequality (10), can be written as: $B(1-A) \geq 1-A$

Which holds true, therefore Inequality (10) is true.

Equation (9) can be represented as: $A + B - CB$. Where, $$C = \sum_{i=1}^{m} \left( \frac{N_i}{N} \right)^x.$$

But, $C \geq A$, which implies that $CB \geq AB$, therefore, $A+B-CB \leq 1$, and $CFEV \leq 1$ From Pads A and B of the proof, it has been shown that:

$$0 \leq CFEV \leq 1$$

As shown by the examples in FIG. 17 and FIG. 18 CFEV produces a value that is closest to the biggest cluster in the set for $x=2$. Assuming that the above characteristic is desired, Equation (8), may be written as:

$$CFEV = W_A + \sum_{i=1}^{m} \left(\frac{N_i}{N}\right)^2 (W_{Ai} - W_A) \tag{11}$$

For the remaining of this description $x=2$ will be used when the CFEV is computed.

EXAMPLE 7

This example illustrates how the CFEV works. Assuming the following sample data:

| Observations | 1 | 2 | 2 | 2 | 2 | 1 | 1 | 1 |
|---|---|---|---|---|---|---|---|---|
| Membership Grades | 0.4 | 0.5 | 0.55 | 0.6 | 0.65 | 0.75 | 0.9 | 1.0 |

For $s=0.2$ and $d=0.15$ the following clusters are formed:
$C_1$: 0.4, 0.5, 0.5, 0.55, 0.55
$C_2$: 0.6, 0.6, 0.65, 0.65, 0.75
$C_3$: 0.9, 1.0
The mean of the three formed clusters is as follows:
$M_{C1}=0.50$
$M_{C2}=0.65$
$M_{C3}=0.95$
The mean of the entire fuzzy set, $m_A$, is equal to 0.6375.

Based on the weighted averages and the number of observations of the entire fuzzy set and that of the individual clusters, the CFEV is computed as follows:

$$CFEV = 0.6375 + \left[\left(\frac{5}{12}\right)^2 (0.5 - 0.6375) + \left(\frac{5}{12}\right)^2 (0.65 - 0.6375) + \left(\frac{2}{12}\right)^2 (0.95 - 0.6375)\right]$$

$CFEV = 0.6245$

SUGGESTED USES

The CFEV, presented in this description, was developed during our study of the test process of computer systems. In this application, a number of commented databases for the IBM 4381 and 9370 computer systems, in the form of bookkeeping libraries, were suspected of containing information pertinent to functional testing, i.e. source of number of changes that were made during the development of a system, and evaluated for the assessment of their pertinence to our study. While a full account of this application can be found in the U.S. patent application Ser. No. 07/701,558, filed May 16, 1991, entitled "A FUZZY REASONING DATA BASE QUESTION ANSWERING SYSTEM", a brief description, leading into the development of the CFEV, is presented as follows: First, all the comments from a bookkeeping library are examined, and a list is created containing all the unique words. Second, a list with the most "relevant" words to the subject of interest, i.e. functional testing, is generated. Subsequently, this list is distributed to personnel who are considered to be experts in the subject. Each person was asked to attribute a confidence value between 0 and 100 for every word in the list reflecting his/her perception of the usage of that word with respect to the subject of interest, i.e. functional testing. In other words, the confidence value indicates how a person perceives that a particular word is most likely used in the comment field or the database. The answers were then scaled with a maximum value equal to one.

After the interviews, it was necessitated to establish a fuzzy expected value for every word in the list of "relevant" words that is close to the one produced by the majority of the survey participants, but also reflects the opinion of the minority. Consequently, the CFEV was developed, and applied in summarizing the replies of the survey participants.

The present invention may also be used in cases where the average of a set of numbers does not give the desired answer. For example, assume a machine whose temperature is measured by ten temperature sensors on various parts of the machine, and assume that the ten readings need to be compined in one number that represents the temperature of the machine. If all ten sensors are working properly then the average of all ten readings may be a typical answer. If however a sensor is faulty and produces a reading that is false by order of magnitude, then the average will not indicate the proper temperature of the machine. In this case, our method will produce a better result because the CFEV will be close to the majority of the readings and will not be affected by the one faulty sensor as much as the average.

Experimental Evaluation Results and Suggested Uses

In the previous sections we presented a question answering system based on fuzzy logic which employs a Clustering Expected Value System. The tool provides the capability to assess if a database contains information pertinent to a subject of interest and to exclude the irrelevant portion of the database. Each comment of the database is evaluated via a fuzzy evaluator which attributes a fuzzy membership value indicating its relationship to the subject of interest. An assessment is provided for the database as a whole; a decision is given to whether such a database is pertinent to the subject of interest, and comments that are considered as irrelevant to the subject can be discarded. The system has been evaluated by examining the databases created for bookkeeping purposes during the process of normal development of the IBM 4381 computer systems to assess comparatively and experimentally internally to IBM their pertinence to the functional changes that occurred during the development cycle. Our evaluations were performed on four experimental databases derived from the microcode and hardware libraries subsystems indicate the following:

Very few comments have been evaluated by the tool during our experiments which resulted in a big disagreement with the manual evaluation which was used for commercial purposes, indicating that the tool closely respected our perception of which comments corresponded to routine accesses and which to functional errors.

The tool is very close to the manual evaluation regarding the percentages of the database corresponding to .functional changes and routine accesses. Consequently, it can be used to evaluate the pertinence of a database to prespecified subject of interest.

The accuracy of the tool in excluding comments not pertinent to and including comments pertinent to the functional testing is extremely high, suggesting that the tool can be used as a means of exclusion of database entries not pertinent to a prespecified subject of interest.

It needs to be noted that the reported tool accuracy possibly constitutes a worse case scenario because of some comments that will always be interpreted correctly, because of their confidence being 0 or 1, have not been included in the accuracy evaluation.

In our experiments determining the limits of the proposed system, we established a number of uses of our system:

The proposed system is especially useful as an initial estimator when the frequency of more than two relevant words is especially high, and the system may be used to establish the initial evaluation in such instances.

In case it is desirable to establish the precise cause of an error also, the tool should be used as an initial estimator and not as substitute to the natural language question answering system.

We also suggested that, while there are cases in which the proposed system cannot be used as substitute for a natural language question, in such circumstances the tool can be used to justify the development expense of the more complicated system.

Additionally, our experiments with commented databases suggest that the proposed system can be used as a substitute to the natural language question answering system because the fundamental assumptions for its development regarding comments in general hold true and comments with more than two relevant words are not sufficiently frequent to jeopardize its performance.

Finally, we establish that its applicability, assuming the same subject of interest, without modifications, is granted for databases comprising similar characteristics to the database for which the system had been previously applied, and we suggest that the system can be applied with minimum additional development effort to a variety of circumstances provided that the fundamental assumptions for the development of the membership functions are respected in the new application.

While we have described our preferred embodiment of our invention, it will be understood that those skilled in the ad, both now and in the future, may make various improvements and enhancements which fall within the scope of the claims which follow. These claims should be construed to maintain the proper protection for the invention first disclosed.

What is claimed is:

1. A computer system for processing a database having language text records to evaluate their relevance to a predetermined subject of interest, the system comprising:

processors for processing instructions and the text records;

database storage means for storing the text records in the database;

a unique word generator for generating and storing a list of unique words contained in the database;

a relevant word generator for generating and storing a list of relevant words including a system user's selections from the stored list of unique words;

a modified database generator for generating and storing a modified database, the modified database including the list of relevant words and synonyms, if any, associated with each word in the list of relevant words, whereinafter the unique word generator generates a list of unique words of the modified database;

a relevant word table including the list of unique words of the modified database; and means for calculating and storing confidence values associated with each word in the relevant word table, each of the confidence values based on input values from a plurality of personnel other than the system user that reflects their perceptions of a relevance of said each word in the relevant word table to the subject of interest;

said means for calculating and storing confidence values including a clustering fuzzy expected value system for determining a membership grade for said each word in the relevant word table;

said clustering fuzzy expected value system determining said membership grade for a word in the relevant word table including grouping the confidence values for said word in the relevant word table into a plurality of clusters according to a predetermined formula, determining a mean of all the confidence values for said word in the relevant word table, and determining a plurality of mean confidence values each associated with one of said plurality of clusters of said confidence values.

2. The system according to claim 1, wherein the clustering fuzzy expected value system determines the mean of all the confidence values for said word in the relevant word table according to $$W_A = \sum_{i=1}^{m} \left(\frac{N_i}{N}\right) W_{Aj},$$

determines the plurality of mean confidence values according to $$W_{Aj} = \frac{\sum_{j=1}^{n} a_{ij} x_{ij}}{\sum_{j=1}^{n} a_{ij}},$$

and determines the membership grade according to $$CFEV = W_A + \sum_{i=1}^{m} \left(\frac{N_i}{N}\right)^x (W_{Ai} - W_A),$$

where i designates a cluster, $a_{ij}$ is the number of confidence values in the cluster having value $x_{ij}$, m is the number of clusters, x is a parameter based on the field of use of the CFEV, $N_i$ is the number of confidence values in cluster i, and N is the number of all the confidence value.

3. The system according to claim 1, further comprising:

a clustering fuzzy evaluator for calculating and storing a clustered fuzzy expected value for each record in the database, wherein the membership grades are grouped into clusters according to the predetermined formula, and wherein the clustered fuzzy expected value for each record in the database is calculated based on a mean of the membership grades for all words in the list of relevant words and on each mean of the membership grades in each of said clusters.

4. The system according to claim 3, wherein the clustering fuzzy evaluator calculates the clustered fuzzy expected value for a record containing zero words to be equal to zero.

5. The system according to claim 3, wherein the clustering fuzzy evaluator calculates the clustered fuzzy expected value for a record containing one word to be equal to the membership grade for the one word.

6. The system according to claim 3, wherein the clustering fuzzy evaluator calculates the clustered fuzzy expected value for a record containing two words according to the formula $$\frac{1}{1 + ce^{-k(w_i w_j - l2)}}$$

where $w_i$ and $w_j$ are membership grades for the two words; k is a constant greater than zero; l is a value greater than zero and less than one; and c is equal to $(1-m)/m$ where m is a mean of $w_i$ and $w_j$.

7. The system according to claim 3, wherein the clustering fuzzy evaluator calculates the clustered fuzzy expected value for a record containing three or more words according to $$CFEV = W_A + \sum_{i=1}^{m} \left(\frac{N_i}{N}\right)^x (W_{Ai} - W_A),$$

where $W_A$ is the mean of membership grades for all words in the record containing three or more words and is calculated according to $$\sum_{i=1}^{m} \left(\frac{N_i}{N}\right) W_{Aj},$$

where $W_{Ai}$ is the mean membership grade associated with one of the plurality of clusters of said membership grades and is calculated according to $$\frac{\sum_{j=1}^{n} a_{ij} x_{ij}}{\sum_{j=1}^{n} a_{ij}},$$

and where N equals the number of words in the record containing three or more words, i designates a cluster, $a_{ij}$ is the number of words in the cluster having membership grade $x_{ij}$, m is the number of clusters, n is the number of words in a cluster, x is a parameter based on the field of use of the CFEV, $N_i$ is the number of words in cluster i.

8. The system according to claim 3, wherein the system further comprises means for retrieving a record having a fuzzy expected value greater than a predetermined value.

9. A method for evaluating a relevance of a database having text records to a predetermined subject of interest, the method comprising computer executed steps of:

compiling and storing a list of unique words contained in the database having text records;

extracting and storing from the list of unique words a list of relevant words selected by a user of the method;

storing confidence values furnished by personnel other than the user who are familiar with the subject of interest that reflect their perceptions of a relevance of each word in the list of relevant words to the subject of interest; and calculating and storing a membership grade for each word in the list of relevant words, including grouping the confidence values for one word of the list of relevant words into a plurality of clusters according to a predetermined formula, determining a mean of the confidence values for said one word, and determining for each of said clusters a mean of the confidence values in each of said clusters.

10. The method according to claim 9, wherein the step of determining a mean of the confidence values for said one word is according to $$W_A = \sum_{i=1}^{m} \left(\frac{N_i}{N}\right) W_{Aj},$$

the step of determining a mean of the confidence values in each of said clusters is according to $$W_{Aj} = \frac{\sum_{j=1}^{n} a_{ij} x_{ij}}{\sum_{j=1}^{n} a_{ij}}$$

and the step of calculating a membership grade is according to $$CFEV = W_A + \sum_{i=1}^{m} \left(\frac{N_i}{N}\right)^x (W_{Ai} - W_A),$$

where i designates a cluster, $a_{ij}$ is the number of confidence values in the cluster having value $x_{ij}$, m is the number of clusters, x is a parameter based on a field of use of the method, $N_i$ is the number of confidence values in cluster i, and N is the number of all the confidence values for said one word.

11. The method according to claim 9, further comprising a computer executed step of calculating a clustered fuzzy expected joined confidence]value of each text record of the database based on fuzzy logic that incorporates the membership grade of each word in the text record.

12. The method according to claim 11, further comprising a computer executed step of retrieving a text record of the database having a clustered fuzzy expected value within a predetermined range.

13. The method according to claim 11, wherein the step of calculating a clustered fuzzy expected value of each text record is based on the formula $$\frac{1}{1 + ce^{-k(w_i w_j - l2)}}$$

for records containing two words, where $w_i$ and $w_j$ are membership grades of the two words; k is a constant greater than zero; l is a value greater than zero and less than one; and c is equal to $(1-m)/m$ where m is a mean of $w_i$ and $w_j$.

* * * * *